(12) United States Patent
Uetabira

(10) Patent No.: US 10,129,234 B2
(45) Date of Patent: Nov. 13, 2018

(54) IDENTITY CONFIRMATION METHOD AND IDENTITY CONFIRMATION SYSTEM USING LIFE LOG

(71) Applicant: INTERMAN Corporation, Kagoshima (JP)

(72) Inventor: Shigeki Uetabira, Kagoshima (JP)

(73) Assignee: INTERMAN Corporation, Kagoshima (JP)

( * ) Notice: Subject to any disclaimer, the term of this patent is extended or adjusted under 35 U.S.C. 154(b) by 53 days.

(21) Appl. No.: 15/038,064

(22) PCT Filed: Nov. 18, 2014

(86) PCT No.: PCT/JP2014/080563
§ 371 (c)(1),
(2) Date: May 20, 2016

(87) PCT Pub. No.: WO2015/076278
PCT Pub. Date: May 28, 2015

(65) Prior Publication Data
US 2016/0301674 A1 Oct. 13, 2016

(30) Foreign Application Priority Data
Nov. 20, 2013 (JP) .................................. 2013-239485

(51) Int. Cl.
*H04L 29/00* (2006.01)
*H04L 29/06* (2006.01)
(Continued)

(52) U.S. Cl.
CPC .............. *H04L 63/08* (2013.01); *G06F 21/31* (2013.01); *G06Q 10/10* (2013.01); *G06Q 50/01* (2013.01);
(Continued)

(58) Field of Classification Search
CPC .......... H04L 63/08; G06F 21/31; G06Q 10/10
(Continued)

(56) References Cited

U.S. PATENT DOCUMENTS 6,549,192 B1 4/2003 Fujita et al.
6,954,735 B1 10/2005 Djupsjobacka et al.
(Continued)

FOREIGN PATENT DOCUMENTS

EP 1166493 B1 * 4/2005 ............... H04L 9/08
JP 2002-211358 A 7/2002
(Continued)

OTHER PUBLICATIONS

Masakatsu Nishigaki, et al. "A User Authentication Based on Personal History," IPSJ Journal, vol. 47, No. 3, Mar. 15, 2006, p. 945-956, 12 pgs.
(Continued)

*Primary Examiner* — Anthony D Brown
*Assistant Examiner* — Michael D Anderson
(74) *Attorney, Agent, or Firm* — Maier & Maier, PLLC

(57) ABSTRACT

Provided are an identity confirmation method and an identity confirmation system in which it is not necessary to keep a password in memory and in which a credential used for authentication is changed automatically without requiring a user operation. Life log data for the user is received, life log data history is accumulated and managed, the life log data history is referenced to generate a question relating to history that the user is likely to know, the question is transmitted over the Internet to a mobile communication device, an answer to the question relating to history produced by the user and transmitted from the mobile communication device is received over the Internet, the answer from the user is evaluated to determine whether or not the
(Continued)

answer is correct, and the success or failure of identification is determined on the basis of the evaluation result.

10 Claims, 23 Drawing Sheets

(51) Int. Cl.
| | | |
|---|---|---|
| *H04W 4/02* | (2018.01) | |
| *H04W 4/029* | (2018.01) | |
| *G06Q 10/10* | (2012.01) | |
| *G06Q 50/00* | (2012.01) | |
| *G06F 21/31* | (2013.01) | |
| *H04W 12/06* | (2009.01) | |

(52) U.S. Cl.
CPC ......... *H04L 63/0428* (2013.01); *H04W 4/023* (2013.01); *H04W 4/029* (2018.02); *H04W 12/06* (2013.01)

(58) Field of Classification Search
USPC .......................................................... 726/6
See application file for complete search history.

(56) References Cited

U.S. PATENT DOCUMENTS

| | | | |
|---|---|---|---|
| 2004/0053654 A1* | 3/2004 | Kokumai | G06F 21/31 463/1 |
| 2004/0092269 A1 | 5/2004 | Kivinen | |
| 2004/0254718 A1 | 12/2004 | Cheon | |
| 2004/0260466 A1 | 12/2004 | Ichihara et al. | |
| 2008/0270938 A1 | 10/2008 | Carlson | |
| 2008/0307515 A1 | 12/2008 | Drokov et al. | |
| 2009/0021591 A1* | 1/2009 | Sako | H04N 1/00339 348/211.2 |
| 2009/0063460 A1 | 3/2009 | Selberg | |
| 2011/0219328 A1 | 9/2011 | Ilvessalmi et al. | |
| 2011/0231408 A1* | 9/2011 | Sasaki | G06F 21/6245 707/748 |
| 2012/0214442 A1 | 8/2012 | Crawford et al. | |
| 2012/0289186 A1 | 11/2012 | Ayalur | |
| 2013/0036360 A1 | 2/2013 | Hallsten | |
| 2013/0133055 A1 | 5/2013 | Ali et al. | |
| 2013/0167208 A1 | 6/2013 | Shi | |
| 2014/0215563 A1 | 7/2014 | Kang | |
| 2014/0221012 A1 | 8/2014 | Uetabira | |

FOREIGN PATENT DOCUMENTS

| | | |
|---|---|---|
| JP | 2004-306821 A | 11/2004 |
| JP | 2009-093273 A | 4/2009 |
| JP | 2010-224667 A | 10/2010 |
| JP | 2011-070341 A | 4/2011 |
| JP | 2012-203781 A | 10/2012 |
| JP | 2013-130954 A | 7/2013 |

OTHER PUBLICATIONS

International Search Report and Written Opinion dated Mar. 3, 2015 of corresponding application No. PCT/JP2014/080563, 6pgs.

Yuuki Ishhara, et al. "Authentication system using Lifelog," IPSJ Symposium Series, vol. 2007, No. 1, Jun. 29, 2007, p. 264-268, 5 pgs.

Tomoki Watanabe, et al. "Base technology for lifelog utilization services," NTT Technical Journal, vol. 22, No. 7, Jul. 1, 2010, p. 16-19, 4 pgs.

Tomoaki Ueda, "Design of Life Log System Based on Activity Recognition with Smartphones", The Papers of Technical Meeting on "Information Systems", IEEE Japan, Jun. 21, 2013, p. 33-37, 5 pgs.

* cited by examiner

| No. | Date | Time | Latitude | Longitude | Cell-ID | Sensitivity |
|---|---|---|---|---|---|---|
| ⋮ | ⋮ | ⋮ | ⋮ | ⋮ | ⋮ | ⋮ |
| 00014238 | 20110828 | 113229 | 35.415915 | 139.658804 | 10922 | 78 |
| 00014239 | 20110828 | 153437 | 35.413829 | 139.653372 | 10932 | 81 |
| ⋮ | ⋮ | ⋮ | ⋮ | ⋮ | ⋮ | ⋮ |

ID: 415bfa41

| No. | Date | Time | Latitude | Longitude | Cell-ID | Sensitivity |
|---|---|---|---|---|---|---|
| ⋮ | ⋮ | ⋮ | ⋮ | ⋮ | ⋮ | ⋮ |
| 00012247 | 20110828 | 114832 | 35.415915 | 139.658804 | 10919 | 70 |
| 00012248 | 20110828 | 153056 | 35.413312 | 139.660393 | 10922 | 70 |
| ⋮ | ⋮ | ⋮ | ⋮ | ⋮ | ⋮ | ⋮ |

| ID | Date | Time | Latitude | Longitude | Cell-ID | Sensitivity |
|---|---|---|---|---|---|---|
| ⋮ | ⋮ | ⋮ | ⋮ | ⋮ | ⋮ | ⋮ |
| 415bfa41 | 20111003 | 181122 | 35.668781 | 139.549802 | 10922 | 82 |
| 0bfa4911 | 20111003 | 181131 | 35.681370 | 139.748938 | 10916 | 81 |
| ⋮ | ⋮ | ⋮ | ⋮ | ⋮ | ⋮ | ⋮ |

Fig. 6

*Log-in through Identity Provider*

User ID: [          ]

*Where have you stayed yesterday at around 2 p.m. ?*

| cafe Monet for about 30 min | 7-11 for about 10min |
| Isetan for about 20min | McDonald for about 30min |
| Hibiya Libray for about 60min | Skip |

Fig. 8

*Where did you visit in the summer four years ago ?*

| Chicago | Tokyo |
| LosAngels | Washington |
| Xian | Skip |

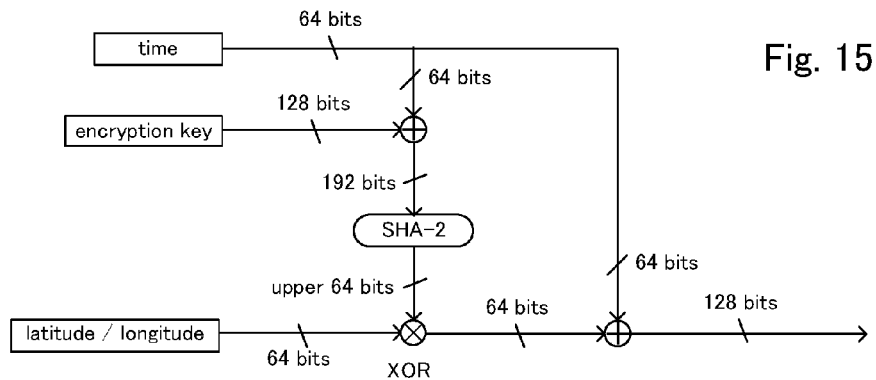
Fig. 15
| 0 → | 0x5274973a | |
| | ⋮ | ⋮ |
| | 035.681370 | 139.658804 |
| | 035.707803 | 139.680468 |
| A → | 035.682391 | 139.660322 |
| A+1 → | 035.583804 | 139.566928 |
| | 035.684032 | 139.662928 |
| A+3 → | 035.804589 | 139.967989 |
| | 035.685932 | 139.664923 |
| A+5 → | 035.137068 | 139.869309 |
| | 035.689239 | 139.666771 |
| A+7 → | 035.937390 | 139.629863 |
| | ⋮ | ⋮ |
Fig. 16
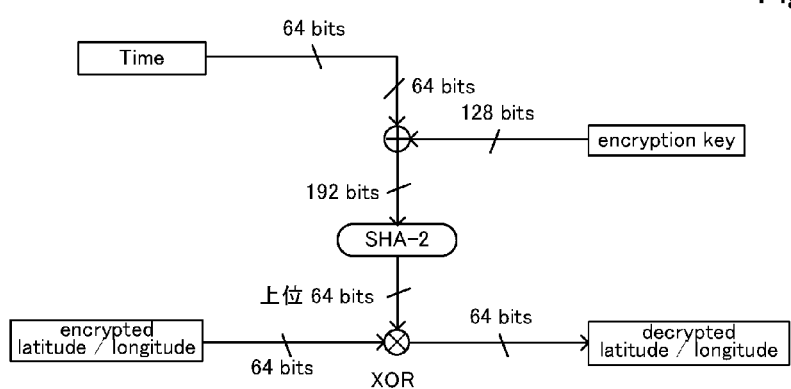
Fig. 17

Fig. 19

| No. | Date | Time | Location Inf. | Inclination | Azimuth | Temperature | Pressure | Weather | Illuminance | Proximity |
|---|---|---|---|---|---|---|---|---|---|---|
| ..... | ..... | ..... | ..... | ..... | ..... | ..... | ..... | ..... | ..... | ..... |
| 00014238 | 20141104 | 181119 | 35.682712, ... | 78 | 39.0 | 18.3 | 1024.8 | 3 | 30.7 | 1 |
| 00014239 | 20141104 | 181131 | 35.681370, ... | 81 | 84.5 | 17.9 | 1024.9 | 2 | 59.2 | 1 |
| ..... | ..... | ..... | ..... | ..... | ..... | ..... | ..... | ..... | ..... | ..... |

Fig. 20

| Date | Time | Location Inf. | Motion Code |
|---|---|---|---|
| ⋮ | ⋮ | ⋮ | ⋮ |
| 20110103 | 181119 | 35.683283, ⋯ | 4 |
| 20110103 | 182131 | 35.683730, ⋯ | 3 |
| ⋮ | ⋮ | ⋮ | ⋮ |

Fig. 21

| Date | Time | Operation Code | Operation Data |
|---|---|---|---|
| ⋮ | ⋮ | ⋮ | ⋮ |
| 20110123 | 192242 | 22 | https://www.⋯ |
| 20110123 | 210131 | 37 | http://www.⋯ |
| ⋮ | ⋮ | ⋮ | ⋮ |

Fig. 23

| No. | Date | Time | Sender/Recipient | Mail Address | Source Text |
|---|---|---|---|---|---|
| ⋮ | ⋮ | ⋮ | ⋮ | ⋮ | ⋮ |
| 00014243 | 20120403 | 181119 | Jones | Jones@yahh⋯ | 0x4fc321db |
| 00014244 | 20120403 | 181131 | William | William@yahh⋯ | 0x4ae421f8 |
| ⋮ | ⋮ | ⋮ | ⋮ | ⋮ | ⋮ |

Fig. 22

| No. | Date | Time | Speech Partner | Speech Time | Telephone No. | Calling Success | Conversation text | Conversation data |
|---|---|---|---|---|---|---|---|---|
| ..... | ..... | ..... | ..... | ..... | ..... | ..... | ..... | ..... |
| 00014238 | 20110103 | 181119 | Jones | 07:22 | 03-1234-5678 | 1 | 0x4fc321db | 0x41dfc2b3 |
| 00014239 | 20110103 | 181131 | William | 02:53 | 03-1234-5678 | 1 | 0x4a1a8e42 | 0x4a21f8e4 |
| ..... | ..... | ..... | ..... | ..... | ..... | ..... | ..... | ..... |

Fig. 24

Please select a correct item (multiple selection allowed)

*Yesterday*

| Out in a rainy day | Smartphone was hardly used |

| Out until 12PM | Telephone calls were made only two or three times |

| Smartphone was not taken out from a pocket/bag | Smartphone was left on a desk for an hour or longer |

Fig. 25

Please select a correct item (multiple selection allowed)

*Recent situation*

| Three or more persons were added to address book in the last few days | "Patent salor" was added to my favorite |

| Five or more messages were mailed to Mr. M in the last few days | Did not talk with Mr. K on the telephone in the last few days |

| Talked with Mr. S on the telephone for an hour or more in the last few days | Frequently used Illustrator |

Fig. 27

| Date | Time | Appliance Code | Operation Code | Operation Data |
|------|------|----------------|----------------|----------------|
| ⋮ | ⋮ | ⋮ | ⋮ | ⋮ |
| 20110103 | 181119 | 7 | 12 | 0500 |
| 20110103 | 181131 | 2 | 22 | 0500 |
| ⋮ | ⋮ | ⋮ | ⋮ | ⋮ |

Fig. 28

Please select a correct item (multiple selection allowed)

*Yesterday*

| Five or fewer messages were transmitted/received | In a room in the light cloudy day |
| Viewed the NNN news site | Called up Mr.S but failed |
| Having a telephone conversation for 20 minites or longer | Made a handsfree telephone call |

Fig. 29

Please select a correct item (multiple selection allowed)

*Recent situation*

| Often light out about 12PM | Amount of rice in rice cooker is about 5 go |
| Always not short of vegetables and fruits | Set temperature of air conditioner is 25°C |
| Air conditioner is timer reserved at 5AM | Washer dryer is routinely used afternoon |

Fig. 30

Please select a correct item (multiple selection allowed)

*Yesterday*

| Used refrigerator at about AM12 | Washed clothes |
| Traveled by automobile | Did not use rice cooker |
| Away from home | Did not use air conditioner |

Fig. 31

Please select a correct item (multiple selection allowed)

*Recent situation*

| Five or more messages were mailed to Mr. M in the last few days | Did not talk with Mr. K on the telephone in the last few days |
| Frequently used Illustrator | Viewed the NNN news site |
| Air conditioner is timer reserved at 5AM | Washer dryer is routinely used afternoon |

Fig. 32

Please select a correct item (multiple selection allowed)

*Yesterday*

| Used refrigerator at about AM12 | Smartphone was not taken out from a pocket/bag |
| Out until 12PM | did not use rice cooker |
| Out in a rainy day | Traveled by automobile |

Fig. 33

| No. | Date | Time | Broadcast Type | Channel No. | Operation |
|---|---|---|---|---|---|
| ⋮ | ⋮ | ⋮ | ⋮ | ⋮ | ⋮ |
| 00023814 | 20150103 | 13814 | 1 | 101 | 0x813C4 |
| 00023815 | 20150103 | 13814 | 1 | 101 | 0xF18B5 |
| ⋮ | ⋮ | ⋮ | ⋮ | ⋮ | ⋮ |

Fig. 34

Which programs have you watched this week?

| News at seven o' clock | Variety 11 |
| Historical figures | Golf school |
| Pro wrestling relay broadcasting | Business news |

Fig. 35

Which programs are reserved?

| Enter a great detective | Variety 11 |
| Historical figures | Golf school |
| Pro wrestling relay broadcasting | Drama 10 |

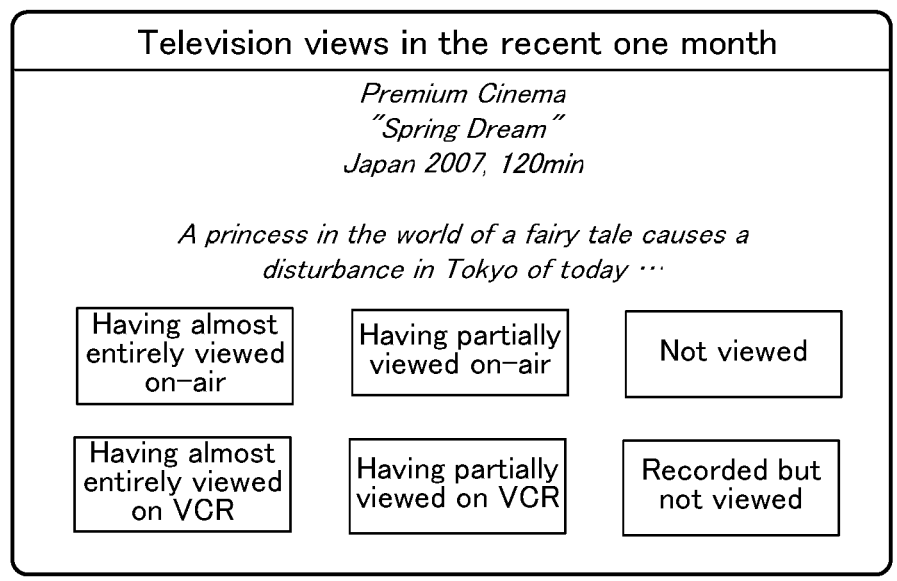

Fig. 37

Life Log Settings

Sensor Information (Smartphone)
- ☑ position  ☑ acceleration  ☑ atmospheric pressure  ☑ temperature
- ☑ inclination  ☑ azimuth  ☑ proximity  ☑ illuminance

Smart Appliance Iformation
- ☑ refrigerator  ☑ microwave oven  ☑ rice cooker  ☑ air conditioner
- ☑ lighting apparatus  ☑ washer dryer

Television/Recorder Information
- ☑ TV on/off  ☑ viewed program  ☐ recording

Application Usage Information
- ☑ program start/end  ☐ favorites of browser
- ☐ website browsing history  ☐ mail send/rec  ☐ mail content

Call History
- ☑ transmission/reception date  ☐ title  ☐ body
- ☑ recipient name  ☐ recipient address

[ OK ]  [ CANCEL ]

IDENTITY CONFIRMATION METHOD AND IDENTITY CONFIRMATION SYSTEM USING LIFE LOG

FIELD OF THE INVENTION

The present invention relates to an identity confirmation method and an identity confirmation system using a life log for performing identity confirmation on the Internet.

BACKGROUND ART

In recent years, smartphones, cellular phones, PHS(Personal Handyphone System) and the like mobile terminals have continued to spread into a broad range of applications. Besides basic verbal communication functionality, the data communication capabilities of these terminals have been enhanced to provide users with a variety of information services through the Internet. Particularly, a variety of service making use of current location information provided by GPS or the like (Patent Document 1).

Also, when logging in, a user has to input an ID and a password for confirming user identity to use a service. When using a plurality of services, an ID and a password have to be determined for each service, it becomes a burden on the user to keep them in mind. In this situation, an authentication provider makes it possible to use a single sign-on protocol such as OAuth, OpenID (Patent Document 2).

PRIOR ART LITERATURE

Patent Document

[Patent Document 1] Japanese Patent Published Application No. 2011-070341
[Patent Document 2] Japanese Patent Published Application No. 2012-203781

However, even under such a single sign-on environment, it is still a substantial burden on a user to manage an ID and a password. First of all, an appropriate password must be selected. A trivial password can be easily cracked. However, it is hard to remember a complicated password. It is particularly troublesome for a user to select an appropriate password.

It is particularly troublesome for a user to select an appropriate password. It is thereby recommended to periodically change a password. If a password is periodically changed, it is a further burden on a user to select a password again as described above. Accordingly, many users are negligent in periodically changing their passwords.

It is therefore an object of the present invention to provide an identity confirmation method and an identity confirmation system which do not require users to remember passwords.

It is another object of the present invention to provide an identity confirmation method and an identity confirmation system which automatically update credentials for use in identity confirmation, without need for the manipulation by users.

SUMMARY OF THE INVENTION

In order to accomplish the object as described above, an identity confirmation method of the present invention is a method of performing identity confirmation of a user by a server on the Internet, and comprises: a step of receiving life log data from a mobile communication device of the user through the Internet; a step of accumulating and managing a history of the life log data; a step of creating a question about the history, which can be answered by the user, with reference to the history of the life log data; a step of transmitting the question about the history to the mobile communication device through the Internet; a step of receiving through the Internet an answer which is provided by the user to the question about the history and transmitted from the mobile communication device; a step of evaluating whether or not the answer provided by the user is correct; and a step of determining whether to make the identity confirmation succeed on the basis of the result of the evaluation.

In accordance with one implementation example, the method is characterized in that the life log data is data acquired from a smart appliance.

In accordance with another implementation example, the method is characterized in that the mobile communication device is provided with functionality of controlling the operation of the smart appliance, and the life log data which is acquired from a smart appliance is transmitted to the server through the mobile communication device.

In accordance with a further implementation example, the method is characterized in that the life log data is data acquired from a sensor which is incorporated in the mobile communication device.

In accordance with a further implementation example, the method is characterized in that the sensor is any one of an acceleration sensor, a gyro sensor, an azimuth sensor, an atmospheric pressure sensor, a temperature sensor, a proximity sensor and an illuminance sensor.

In accordance with a further implementation example, the method is characterized in that the mobile communication device is provided with functionality of transmitting and receiving email, and wherein the life log data is data about the transmission and reception of email performed by the mobile communication device.

In accordance with a further implementation example, the method is characterized in that the mobile communication device is provided with functionality of telephone conversation, and wherein the life log data is data about telephone conversation performed by the mobile communication device.

BRIEF DESCRIPTION OF DRAWINGS

FIG. 2 is a view for showing history tables of a history database corresponding to the mobile communication devices in accordance with the embodiment 1 of the present invention.

FIG. 3 is a view for showing a current location table of a history database in accordance with the embodiment 1 of the present invention.

FIG. 6 is a view for showing a log-in dialog of the service provider to verify the identity of a user through the authentication by the identity provider.

FIG. 7 is a view for showing a question dialog in which a multiple-choice question is displayed by the identity provider in accordance with the embodiment 1 of the present invention.

FIG. 8 is a view for showing another question dialog in which a multiple-choice question is displayed by the identity provider in accordance with the embodiment 1 of the present invention.

FIG. 15 is a view for explaining the method of encrypting the latitude and longitude information in accordance with an embodiment 6 of the present invention.

FIG. 16 is a view for showing the storage configuration of the encrypted latitude and longitude information in accordance with the embodiment 6 of the present invention.

FIG. 17 is a view for explaining the method of decrypting the latitude and longitude information in accordance with the embodiment 6 of the present invention.

FIG. 19 is a view for showing an information table of life log data in accordance with the identity confirmation method of the embodiment 7 of the present invention.

FIG. 20 is a view for showing an information table of life log data in accordance with the identity confirmation method of the embodiment 7 of the present invention.

FIG. 21 is a view for showing an information table of life log data in accordance with the identity confirmation method of the embodiment 7 of the present invention.

FIG. 22 is a view for showing an information table of life log data in accordance with the identity confirmation method of the embodiment 7 of the present invention.

FIG. 23 is a view for showing an information table of life log data in accordance with the identity confirmation method of the embodiment 7 of the present invention.

FIG. 24 is a view for showing a question for use in the identity confirmation method according to an embodiment 7 of the present invention.

FIG. 25 is a view for showing a question for use in the identity confirmation method according to the embodiment 7 of the present invention.

FIG. 27 is a view for showing an information table of life log data in accordance with the identity confirmation method of the embodiment 8 of the present invention.

FIG. 28 is a view for showing a question for use in the identity confirmation method according to the embodiment 8 of the present invention.

FIG. 29 is a view for showing a question for use in the identity confirmation method according to the embodiment 8 of the present invention.

FIG. 30 is a view for showing a question for use in the identity confirmation method according to the embodiment 8 of the present invention.

FIG. 31 is a view for showing a question for use in the identity confirmation method according to the embodiment 8 of the present invention.

FIG. 32 is a view for showing a question for use in the identity confirmation method according to the embodiment 8 of the present invention.

FIG. 33 is a schematic view for showing a table which corresponds to a database of a program viewing history in accordance with the identity confirmation method according to an embodiment 9 of the present invention.

FIG. 34 is a view for showing a question for use in the identity confirmation method according to the embodiment 9 of the present invention.

FIG. 35 is a view for showing a question for use in the identity confirmation method according to the embodiment 9 of the present invention.

FIG. 36 is a view for showing a question for use in the identity confirmation method according to the embodiment 9 of the present invention.

FIG. 37 is a view for showing a dialog through which a user can select life log data which is transmitted to the identity confirmation server and accumulate and managed by the identity confirmation server.

FIG. 38 is a view for showing a table to access encrypted life log data in accordance with the identity confirmation method of an embodiment 10 of the present invention.

MODES FOR CARRYING OUT THE INVENTION

In what follows, identity confirmation methods and identity confirmation systems in accordance with several embodiments of the present invention will be explained with reference to the accompanying drawings. These identity confirmation methods and identity confirmation systems relate to an authentication technique performed on the Internet by making use of a life log.

[Embodiment 1]

In this case, the motion history of a user is used as a life log for performing identity confirmation (authentication). It is assumed that a mobile communication device used by this user is capable of acquiring the current location information and accessing the Internet. More specifically speaking, the mobile communication device includes conventional feature phones, multifunction terminals called smartphones having touch-panel screens, tablet computers, notebook computer and the like. The location information of a mobile communication device can be provided from GPS, Wi-Fi triangulation, cell phone tower triangulation or any combination thereof.

Incidentally, while the location information of each user is accumulated in a server or the like in the following embodiment, it is easy to identify the address of the user's home and the location of the working place or school from the location information history. For example, in location information history data, there may appear location records indicating that the user has stayed home every night and location records indicating that the user has stayed in the working place or school for substantial periods in weekdays. On the other hand, in holidays, there are few location records corresponding to the working place or school. Depending upon the case, this may not be preferred from the view point of privacy. Accordingly, it is preferred to exclude these location records having such patterns from the location information history.

Furthermore, the security of the identity confirmation can be improved by excluding the current location information which is repeatedly transmitted. This is because even another person may recall the working place or the school. The current location information which is not repeated is usually known only by the user.

Figure 1:
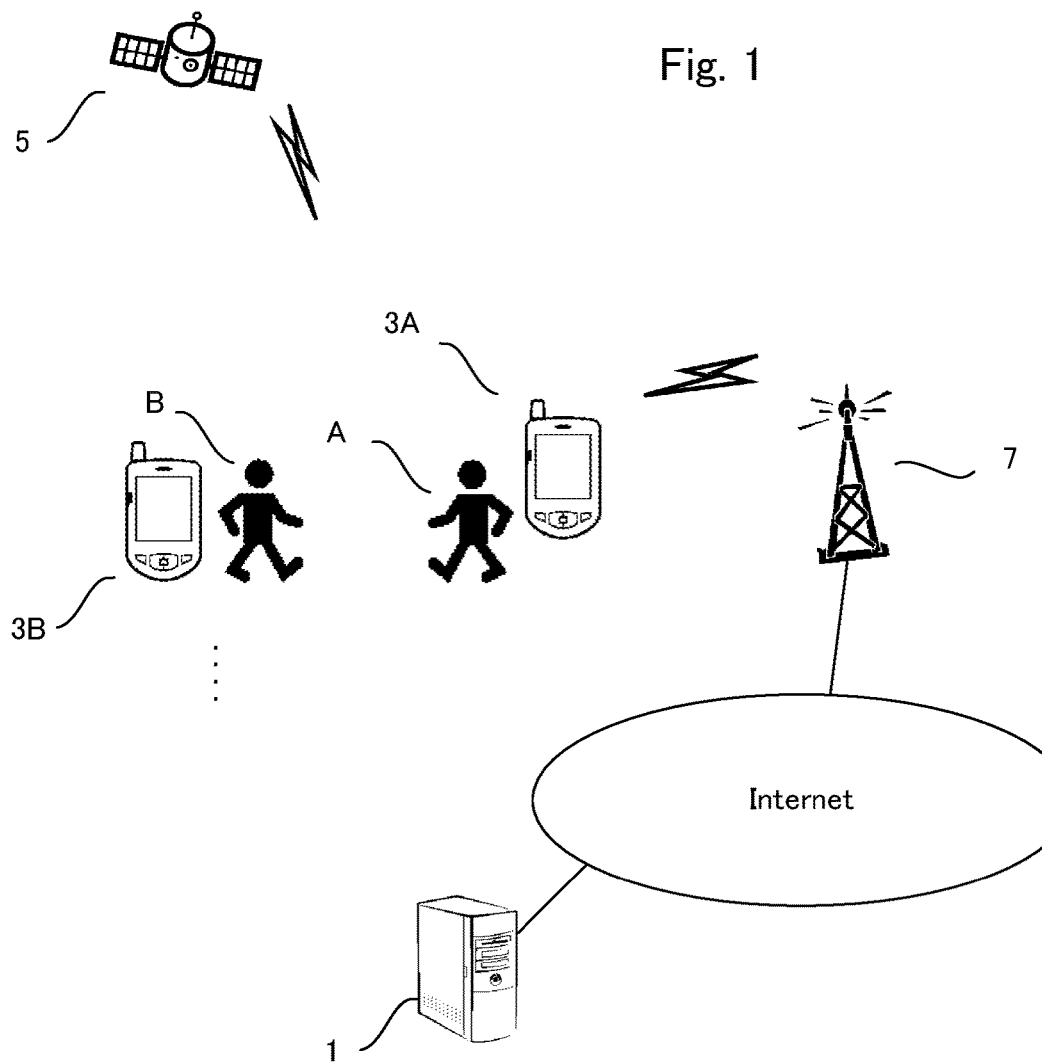
FIG. 1 is a view for explaining a method of collecting location information history data in accordance with an identity confirmation method of an embodiment 1 of the present invention.

Referring to FIG. 1, an identity confirmation server in accordance with an embodiment 1 will be explained. This identity confirmation server (authentication provider) is implemented with a location information history server connected to the Internet. A user who wants to use the service has to download a resident program from a server and install the resident program in a mobile communication device carried by the user.

This resident program acquires the current location information of the mobile communication device and transmits this current location information to the location information history server 1. Needless to say, while only two users, i.e., a user A carrying a mobile communication device 3A and a user B carrying a mobile communication device 3B are illustrated in FIG. 1 as the users of this system, it is assumed that there are a number of other users using this system.

The location information history server 1 is provided with a history database for managing the history. Also, this history database is provided with a history table 2 for each mobile communication device. The history table 2 consists of fields of the date, time, latitude and longitude when recording is performed, the Cell-ID that identifies the communicating base station 7 and a receiving sensitivity. In response to a timer event, the resident program creates a location record indicating the current time, current location, Cell-ID and receiving sensitivity of a mobile communication device.

Each history table 2 is associated with a terminal ID which is allocated to each user when downloading the resident program and unique to this each user. Also, the location records contained in each history table 2 are arranged in a time series with serial numbers. That is to say, each history table 2 is uniquely correlated to an individual terminal ID in a one-to-one correspondence. When transmitting current location information to the location information history server 1, the resident program transmits this terminal ID as well as a Cell-ID and a receiving sensitivity. In place of the terminal ID allocated by the server, an identification number associated with an individual terminal may be used for the same purpose. Specifically speaking, the resident program periodically measures the current location information and acquires the latitude and longitude of the mobile communication device provided from GPS or the like at intervals of several minutes (for example, every five minutes in this case).

The history database of the location information history server 1 includes a current location table in which are stored the current location information of each mobile communication device identified by the terminal ID as illustrated in FIG. 3. The current location table includes fields corresponding to the fields contained in the history table, except for the serial number field which is replaced with a field for storing the terminal ID of each location record.

When receiving a current location information from a mobile communication device, the location information history server 1 determines whether or not this mobile communication device is registered in the current location table on the basis of the terminal ID attached to the current location information. If not registered yet, a new location record is generated on the basis of this current location information, and stored in the current location table in correspondence with this terminal ID. Also, a history table is generated anew in correspondence with this terminal ID.

If already registered, the previous current location information (latitude and longitude) is acquired from the location record corresponding to the terminal ID, and compared with the current location information as received. If these latitude and longitude values are approximately the same (for example, only with a difference of at most 10 meters or the like), the current location information is discarded without further processing.

Conversely, if the current location information as received substantially differs from the previous current location information stored in the current location table, a new location record is added to the history table corresponding to the terminal ID on the basis of the location record of the current location table corresponding to the previous current location information. The location record of the current location table corresponding to this terminal ID is updated with the current location information, Cell-ID, receiving sensitivity and measurement date/time as received. Accordingly, the staying period for which the mobile communication device has stayed in the place designated by a certain location record corresponds to the differential time between this location record and the next location record in the history table.

For example, if a location record at 13:30 is followed by a location record at 14:30, the two location records indicates that the mobile communication device has been located in the place of the first location record for a hour. Namely, if a sequence of location records have continuous time fields in units of cycles of measuring the current location, this sequence indicates that the user was in transit. Conversely, if adjacent location records have discrete time fields, these location records indicate that the user stayed in the place corresponding to the location field of the former location record thereof. Accordingly, the date and time fields of each location record appropriately indicate the date and time in which the mobile communication device has arrived at the place corresponding to the location field except that the user was in transit. The date, time and location of these fields will be called a visit date, a visit time and a visited location hereinbelow because the location records in transit are not important in this context. The Cell-ID and receiving sensitivity fields can be utilized, for example, for evaluating the reliability of the latitude and longitude. On the other hand, the staying period for which the mobile communication device has stayed in the place corresponding to the latest location record in the history table corresponds to the differential visit time between this latest location record and the location record in the current location table corresponding the terminal ID. Incidentally, the staying period in the current location corresponds to the difference between the current time and the visit time of the location record in the current location table corresponding the terminal ID.

As another embodiment, each location record of the current location table may be stored as the latest location record in the history table corresponding to this each location record. Namely, the current location table consists of reference pointers to the latest location records of the history tables corresponding to the mobile communication devices respectively. In this case, the staying period can be calculated only in the history table.

The above process of updating the location information history may includes routines of handling exceptions as described below. Namely, the routines are provided when no location information is available, when the Internet cannot be accessed, and when the resident program has temporarily stopped its operation.

No location information is available, for example, when a sufficient number of GPS satellites cannot be found and Wi-Fi triangulation is not available. In such a case, rough location information is acquired by cell phone tower triangulation to generate a location record with a receiving sensitivity of 0 so that this location record is only reference information and cannot be used in this user similarity provision method. This location record serves also as a padding record between valid location records. The Internet cannot be accessed, for example, when the mobile communication device cannot have any reception. In such a case, the resident program saves location records in the mobile communication device and, when the Internet access becomes available, these location records are transmitted to the location information history server 1. The resident program is temporarily stopped its operation, for example, when the battery of the mobile communication device runs out or when the mobile communication device is turned off. In such a case, after restarting, the resident program resumes transmission of location records. On the other hand, the location record, which is transmitted from the resident program just after restarting and received by the location information history server 1, has a visit time which is not subsequent to the visit time of the latest location record (invalid location record) stored in the location information history server 1, i.e., the difference between these visit times is longer than the current location acquiring interval. In this case, the location information history server 1 generates an invalid location record subsequent to the latest location record in the history table and saves the received location record in the current location table. The visit date and visit time of the invalid location record are those of the location record which would have been received by the location information history server 1 after receiving the latest location record if the resident program had not been stopped. The other fields of the invalid location record are set to 0 respectively to indicate that this record is invalid.

Incidentally, if no location information is available, the user can request the location information history server 1 to insert a location record to the history table of the history database by designating a visit date, a visit time, a visit location and a staying period. In this case, the user can send an insertion request together with text such as "20130101: Hotel Okura in Toranomon (Tokyo) at 15:00 for 4 hours". For example, after posting a message reporting the visit to an SNS, the text of the message can be used for this purpose. The location information history server 1 parses the text to extract a visit date, a visit time, a visit location and a staying period, generates a location record from this information, and insert this location record into an appropriate position of the history table (which may be occupied by an invalid record) in accordance with this extracted information.

Figure 4:
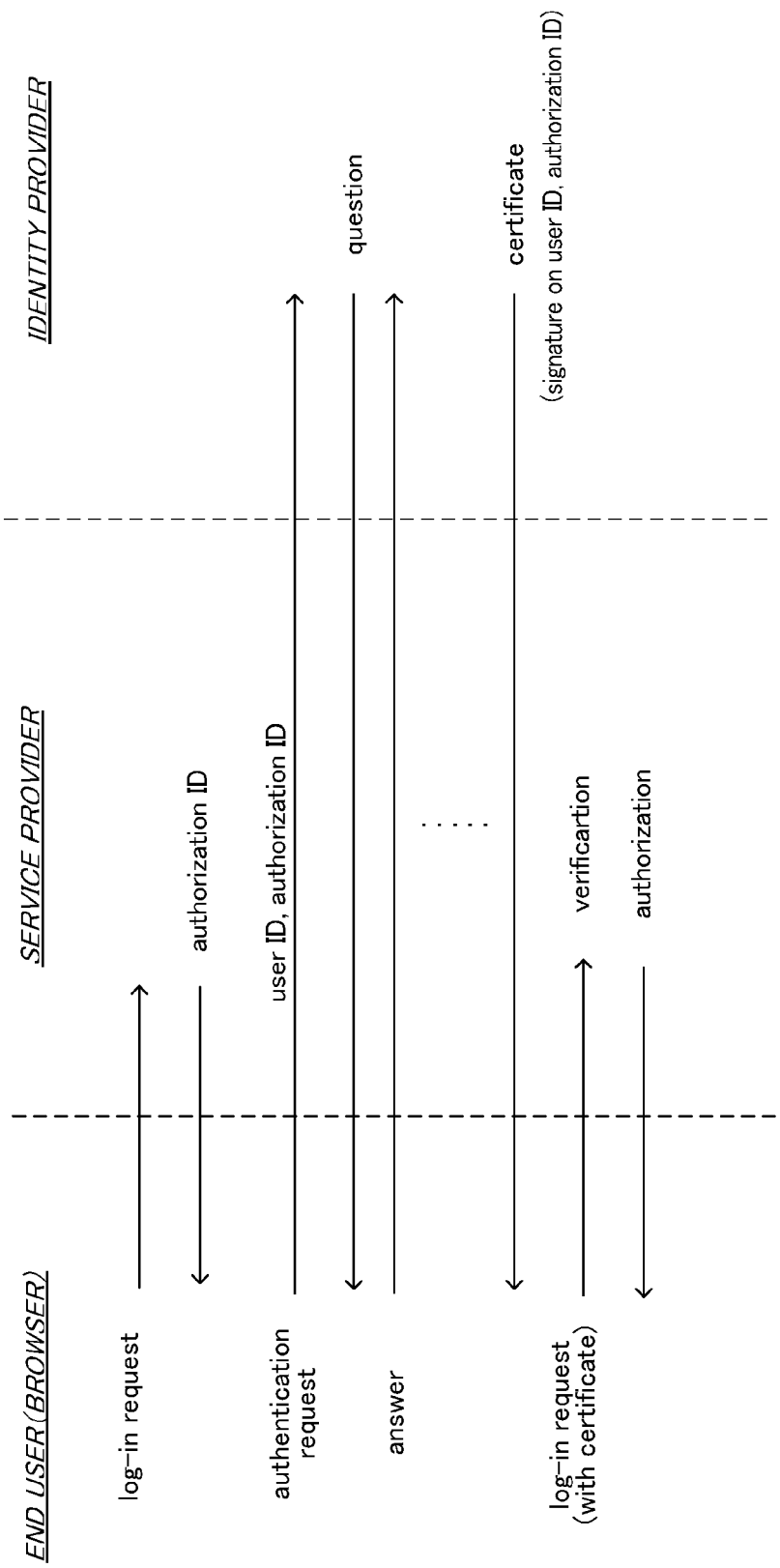
FIG. 4 is a view for explaining the operation of a location information history server serving as an identity provider in a scenario that a user logs in a service provider through a browser by the use of the identity provider in accordance with the embodiment 1 of the present invention.

The above method is implemented with the location information history server 1 which manages the location information histories in detail. A system in which the location information histories of individuals are accumulated can be used as an identity provider (authentication provider) capable of authenticating user identities by the use of the location information histories. In what follows, the operation of the location information history server 1 serving as an identity provider of the embodiment 1 will be explained with reference to FIG. 4 in a scenario that a user logs in a service provider through a browser by the use of the identity provider.

Incidentally, the service provider which performs a log-in process of users through identification by the identity provider has to store the URL and public key of the identity provider in advance. The browser, the service provider and the identity provider communicate with each other through SSL.

First, the user accesses a log-in dialog of the service provider through the browser of a mobile communication device or a personal computer as shown in FIG. 6. The log-in dialog includes a form in which the user can enter a user ID. When the user presses a send button after entering the user ID, an authentication request is redirected to the identity provider. This authentication request is transmitted to the identity provider together with the user ID, the URL of this service provider and an authorization ID.

This authorization ID is issued by the service provider and associated with the user ID and the identity provider. Also, the authorization ID is effective only for a predetermined effective period (for example, twenty minutes). The user has to finish the log-in process within this effective period. Next, an authentication process is performed between the browser and the identity provider as follows.

First, the identity provider opens a question dialog on a mobile communication device or a personal computer as illustrated in FIG. 7 or FIG. 8 in which is displayed a multiple-choice question which is related to the location information history of the user and which can correctly be answered only by that user. The multiple-choice question which is related to the location information history are based on information about, for example, in what place (which nation, which country, which city, which area, which establishment, which mountain, which beach or the like), at what time (what hours before, what days before, what month, what season, what year or the like) and for what length of period (what minutes, what hours or the like) the user has stayed. The user can select one of a plurality of choices and a skip in response to a question.

The user is asked such five questions. If the user can correctly answer three or more out of the five questions, the user is authenticated. The five questions may include one or more irrelevant question consisting only of incorrect choices. In this case, the correct answer is skipping that question. Alternatively, while a password is set up in advance, password authentication may be invoked when, of five answers, three are correct and two are wrong. In this case, if three answers are wrong, the authentication fails, and if four or more answers are correct, the authentication succeeds.

If the user is authenticated, the identity provider generates an electronic certificate (RSA, ECDSA or the like) which certifies this fact, and redirects the browser to the URL of the service provider. This electronic certificate certifies the authentication of the user associated with the user ID and the authorization ID. The service provider verifies this certificate with the public key of the identity provider and, if verified, permits the user to log in the service provided by the service provider.

Next is a description of an example of how to generate multiple-choice questions from the location information history of the user. First, this location information history is searched for extracting two location records of today and yesterday which indicate that the user has stayed in certain places respectively for 10 to 20 minutes. Since the location records are very fresh, the user will remember the details of the events on these days. Accordingly, for example, a location record extracted may generates a choice that "you have stayed yesterday near the cafe Monet at around 2 p.m. for about thirty minutes".

Next, two location records within the previous week are extracted from the location information history in the same manner. Furthermore, one location record is extracted from location records before that. However, the older the location record is, the more distant from the usual moving range the selected place is. Also, if the location record is very old, for example, several years old, the question uses longer time units such as "Spring in 20XX".

After extracting five location records from the location information history of the user, five incorrect location records are selected for each extracted location record to construct one question. Each incorrect location record is obtained by selecting another user at random, selecting one incorrect location record candidate of this another user at random, and confirming this candidate is truly an incorrect location record. The confirmation is performed by fuzzy searching the location information history of the user to be authenticated for each incorrect location record candidate. If a location record is hit in the location information history, this candidate is discarded followed by selecting another candidate.

On the other hand, while each multiple-choice question has six choices including skip, there is inserted one question per six questions consisting only of incorrect choices. For example, a correct location record extracted may be modified as an incorrect choice that "You have stayed yesterday near the cafe Monet at around 12 a.m. for about thirty minutes" by slightly changing the correct location record in order that the user can notice. In this case, the correct answer is a skip.

Incidentally, while there is a button captioned "skip" in the above example, any appropriate caption such as "other" can be used instead. Also, in the above example, a user is identified by a unique terminal ID which has been assigned when downloading the resident program. This terminal ID can be used as the ID of the user. Of course, a user name which is desired by a user may be associated with the terminal ID and used to identify the user in place of the terminal ID itself which is merely a number for managing users. Furthermore, needless to say, the identity confirmation can be performed by the above procedure not only through a mobile communication device but also through any other terminal having a communication capability, for example, a personal computer, a tablet terminal, a smartphone other than the mobile communication device. Namely, while the visited location history is accumulated by the mobile communication device of a user as the base data for generating credentials, this base data can be utilized for confirming user identity independent of the mobile communication device.

It is possible to use more detailed information than the location information history. For example, in the case where an indoor location detection system is available with such a high degree of accuracy as to determine in which floor the user is staying, this detailed information can be added to the history table of the history database. In accordance with the location information records including such detailed information, it is possible to determine which office the user is staying.

Furthermore, in the case where the mobile communication device is implemented with an altimeter, the information about in which floor the user is staying can be obtained on the basis of the detected height information and transmitted to the location history matching server as the detailed information.

[Embodiment 2]

The embodiment 1 relates to a method for simply authenticating a user. The service provider may provide a service which makes use of other resources of a user (for example, user data of an SNS) which can be accessed after identity confirmation of the user. In this case, the identity provider can determine whether to give the service provider the right of accessing the resources of the user.

Meanwhile, the entity managing the identity provider can be managing also the resources of users. Also, another service provider than the identity provider may be managing also the resources of users. Anyway, the service provider, the identity provider, the another service provider and the mobile communication device (or a personal computer used by the user for performing necessary steps of the identity confirmation) as described above are connected to the Internet.

Figure 5:
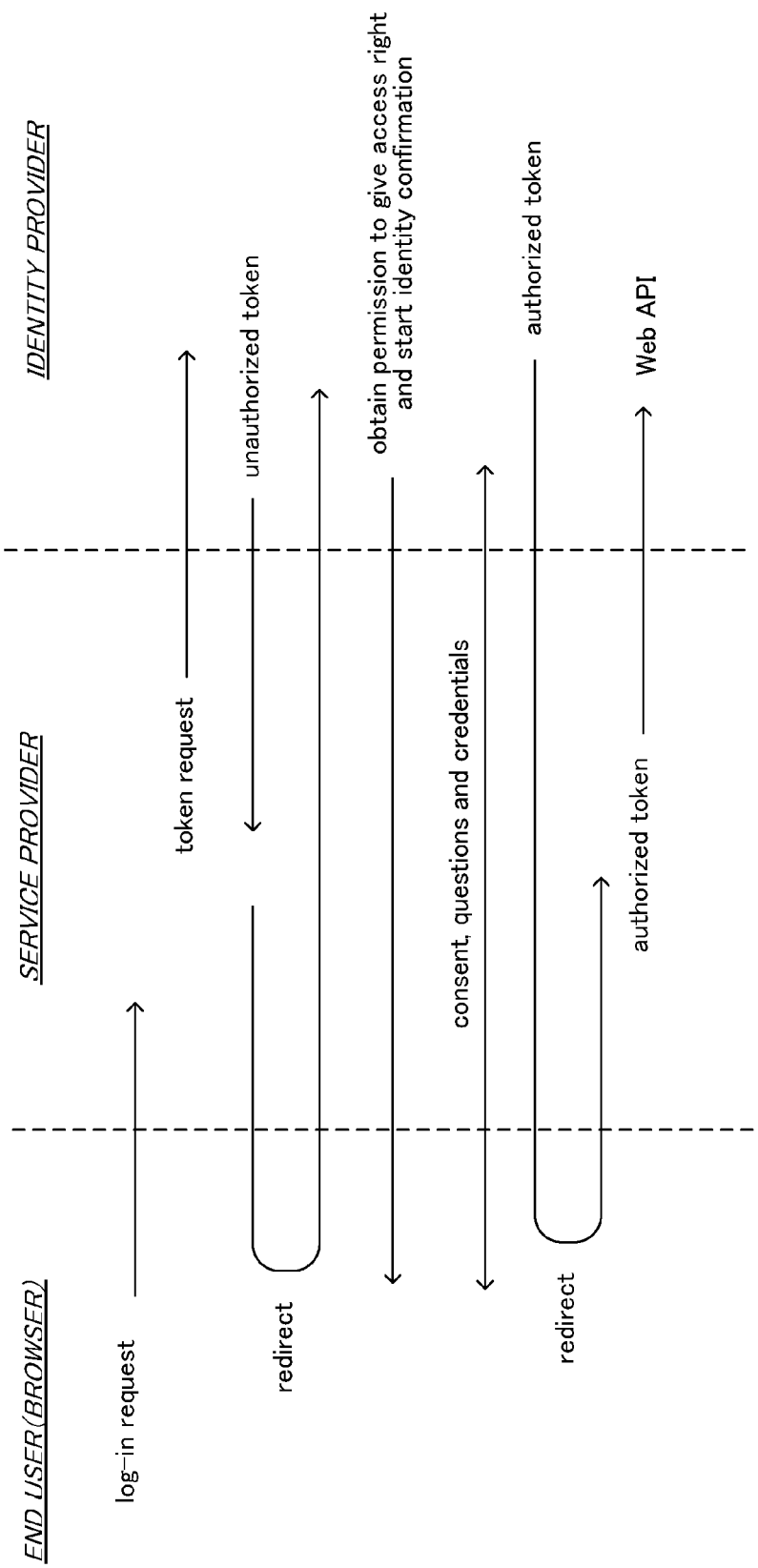
FIG. 5 is a view for explaining a method of authorizing an access to user information by the use of an identity confirmation method in accordance with an embodiment 2 of the present invention.

In what follows, with reference to FIG. 5, it will be explained how to authorize the right of access by the use of the identity confirmation method as described above. It is assumed, however, that a location information history is accumulated and managed in the location information history server, and that the location information history of a user is available.

It is assumed that a user wants to use a service of a service provider which requires user information managed by another service provider so that the user has to give the service provider the right of accessing the user information. The user thereby sends an authentication start request to the service provider to obtain the access right.

After receiving the authentication start request, the service provider sends a token request to the identity provider. This token request contains authentication information about which resource the service provider can be accessed, whether the service provider can modify the resource, the validity period of the access right and so forth.

After receiving the token request, the identity provider returns an unauthorized token to the service provider. The service provider confirms and transfers this unauthorized token to the user who redirects the unauthorized token to the identity provider.

Thereafter, the authentication of the user is performed for identity confirmation between the user and the identity provider. First, after receiving the unauthorized token, the identity provider presents the details of the access right to be given to the service provider, and obtains permission from the user to give the access right and start identity confirmation. The user confirms the details of the access right and agrees to give the access right to the service provider.

The identity confirmation method of the present invention as described above is then performed to confirm the identity. This is transmission of credentials from the user. Namely, the identity provider poses a plurality of multiple-choice questions, for example, five questions. If the user can correctly answer three or more of the five questions, the user is authenticated.

If the identity confirmation succeeds, the identity provider sends an authorized token to the user. This authorized token is re-directed from the user to the service provider. The service provider accesses the resources of the user by the use of the authorized token. For example, the user information can be read through Web APIs.

[Embodiment 3]

In the above embodiment, identity confirmation is performed by multiple-choice questions. However, in this embodiment, the identity provider poses a direct question such as "Where were you staying at □ o'clock on ○○/△△?", and requests the user to directly answer the question. However, since it is cumbersome to answer such a question by inputting words and an answer consisting of words is often ambiguous, the user can answer through a map. The following procedure replaces the procedure corresponding to "question" and "answer" in FIG. 4. The other procedure is same as in the embodiment 1 or 2.

Namely, the user accesses a log-in dialog of the service provider through the browser as shown in FIG. 6. The log-in dialog includes a form in which the user can enter a user ID (user name). When the user presses a send button after entering the user ID, an authentication request is redirected to the identity provider. The authentication request includes the URL of this service provider and an authorization ID together with this user ID.

Figure 9:
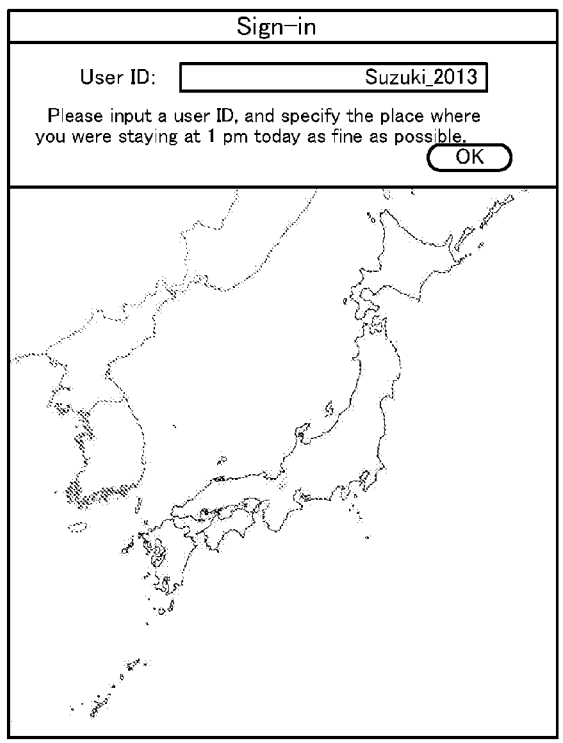
FIG. 9 is a view for showing a question dialog in which a map is displayed for use in the identity confirmation method according to an embodiment 3 of the present invention.

First, the identity provider displays the whole map of Japan as illustrated in FIG. 9, and poses a question about a past staying place of the user, for example, "Please input a user name, and specify the place where you were staying at 1 pm on November 3rd as fine as possible". The more recent the time relating to the question is, the closer to the usual moving range the places in a question are selected. Conversely, the more timely distant, the more remote from the usual moving range the places are selected. The user is informed of this selection algorithm so that, for example, if the question is of a year ago, the user can answer the question by recalling the memory of personal and business trips a year ago. Namely, after inputting a user name uniquely corresponding to the terminal ID, the user answers the question by recalling the memory on the date/time and designating (inputting) the place.

Figure 10:
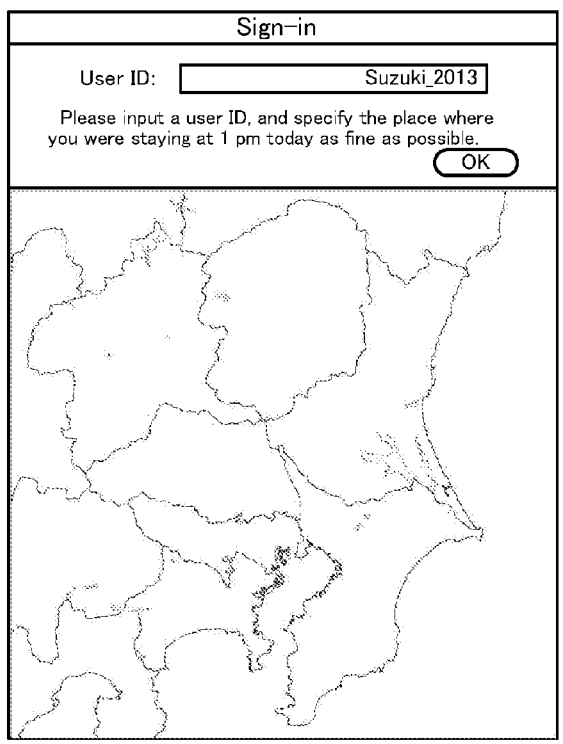
FIG. 10 is a view for showing a window in which the question is posed with an expanded view of the map for use in the identity confirmation method according to the embodiment 3 of the present invention.
Figure 11:
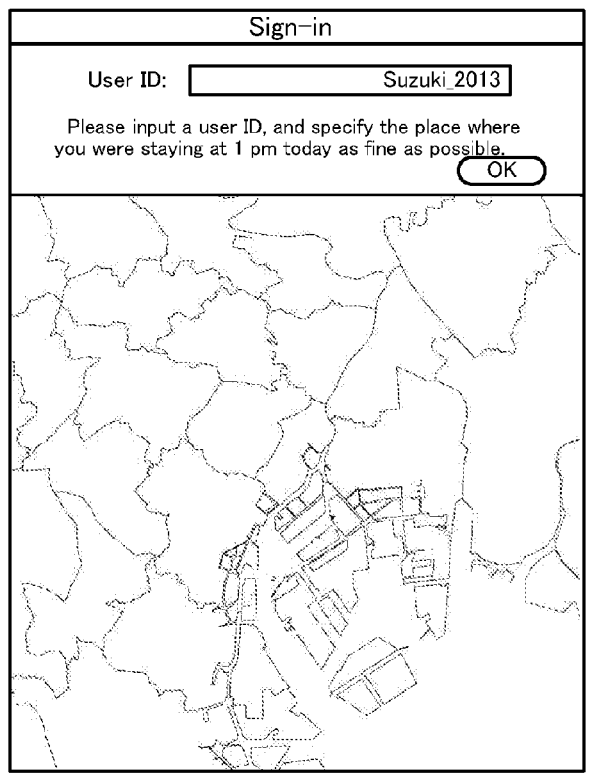
FIG. 11 is a view for showing a window in which the question is posed with a further expanded view of the map for use in the identity confirmation method according to the embodiment 3 of the present invention.
Figure 12:
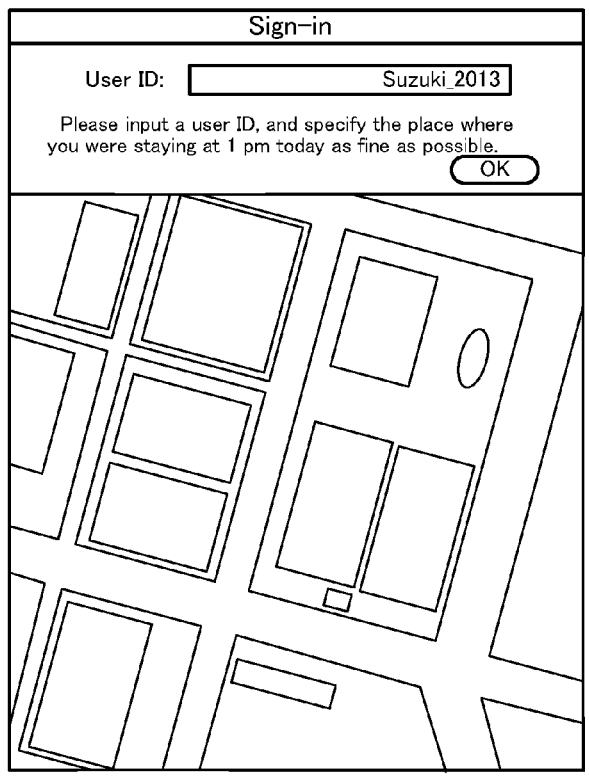
FIG. 12 is a view for showing a window in which the question is posed with a further expanded view of the map for use in the identity confirmation method according to the embodiment 3 of the present invention.

For example, if the user was staying in a certain place of Tokyo, this place can be input by the following steps. First, the user clicks (taps) near Tokyo in the whole map of Japan as illustrated in FIG. 15. The identity provider then displays an expanded map around Tokyo as illustrated in FIG. 10. The user clicks a certain area of the expanded map where he was staying. In response to this, the identity provider displays again a further expanded map therearound as illustrated in FIG. 11. The user clicks near the certain place of Tokyo where he was staying in the further expanded map. The identity provider then displays a street map around the place he clicked as illustrated in FIG. 12. Finally, the user shifts the displaying position of the street map, if necessary, to display the certain place where he was staying, and clicks this place. Then, the user presses an OK button displayed above the map to finish the input.

If the place which is input is correct, the identity provider determines that the user correctly answered. However, in this case, the result is not simple as whether the answer is correct or not, but given as a score which becomes higher as the input place is closer to the correct place stored in the history table. For example, if the difference between the input place and the correct place is within 20 m, the score is 10. If the difference is between 20 m and 100 m, the score is 9 or the like. However, since the difficulty level becomes high if the question relates to an older period, a higher score is given to a question relating to an older period.

The displayed map can be expanded/reduced by pinching in/out, and moved by dragging if desired. For example, if the user was travelling abroad on business, the map displayed as shown in FIG. 9 is pinched out and dragged to show an area including a foreign country to display the visited place. Also, when the user has only a dim memory, he presses the OK button to input an answer when the displayed map has an intermediate scale size as illustrated in FIG. 11. In this case, even if the user clicked near the correct place, the score is low such as 1 or 2. If the user presses the OK button to input an answer while the displayed map does not include the correct place, the score is a minus value. While a maximum of 5 questions are posed, the identity provider determines that the identity is confirmed when the total score exceeds 20.

After authenticating the user, the service provider generates and redirects an electronic certificate (RSA, ECDSA or the like) to the URL of the service provider. The electronic certificate associates the user ID with the authorization ID to authenticate the user. The service provider verifies this electronic certificate with the public key of the identity provider, and permits the user of the user ID to log in. This is the same as that of the embodiment 1.

[Embodiment 4]

In the above embodiment 3, the identity provider poses a question relating to one place the user was staying, such as "Where were you staying at □ o'clock on ○○/△△?". However, in this embodiment 4, the identity provider poses a question to request the user to show a route pattern including a plurality of staying places in stead of a single place. For example, the identity provider poses a question such as "Please input a user name, and specify three places where you were successively staying after 1 pm today as fine as possible in order of time. The other process is the same as that of the embodiment 3.

Figure 13:
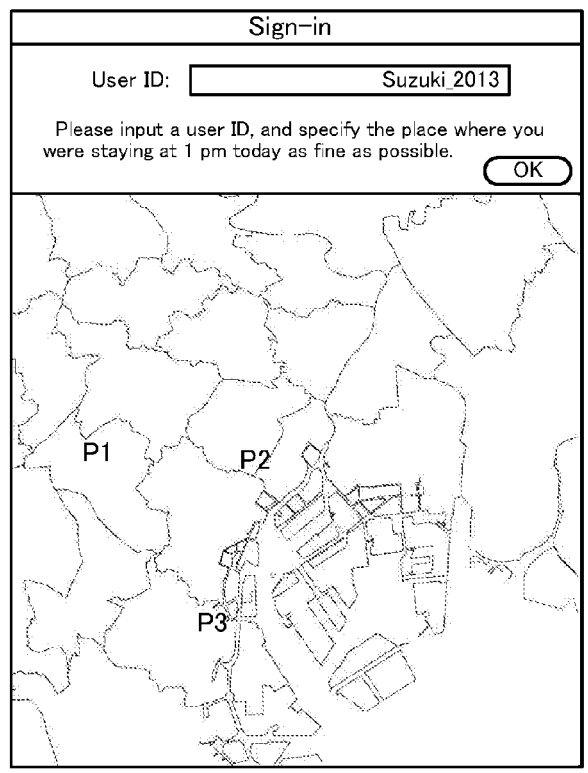
FIG. 13 is a view for showing an answer screen to specify a plurality of places for use in the identity confirmation method according to the embodiment 3 of the present invention.

In response to this question, if the user clicks (taps) points P1, P2 and P3 in this order on a map as illustrated in FIG. 13. This operation means, for example, that the user inputs a route pattern in which he stayed in the point P1 about 1 pm on the 3rd day of November, and then moved to the point P2, and further moved to the point P3.

Receiving this answer, the identity provider refers to the history database of the user, and confirms whether or not there is a route pattern corresponding to the points P1, P2 and P3 after about 1 pm on the 3rd day of November. If there is such a route pattern in the history database, for example, the score is 10. If there are three points in the history database corresponding to the input three points in a wrong order, a lower score such as 5 is given. If there are two points in the history database corresponding to two of the input three points and the remaining point is wrong, a further low score such as 3 is given. If there is only one point in the history database corresponding to one of the input three points, for example, a further low score such as 1 is given. Namely, the score is increased or decreased in accordance with the degree of similarity of the route pattern.

The answer to this type of a question includes three places, so that the number of questions to be posed may be smaller than that of the embodiment 3. For example, the identity provider poses three questions at a maximum. The identity provider determines that the identity of the user is confirmed when the total score exceeds a predetermined points (for example 10).

Since the identity provider requests a route pattern which is more difficult than a single place, it is difficult to answer if questions relates to old periods. Accordingly, questions are prepared from the location information history within past three days in order that each route pattern includes distinctive places. For example, when the three points are located too close to each other, or when the staying period is too short, the identity provider redoes selection of a route pattern again.

Also, the identity provider may allow the user to select the selection settings of the area and period in which route patterns are generated. For example, the area and period of route patterns can be accorded with the trend in behavior of the user, for example, "motion within 30 m from 10 minutes ago to 5 minutes ago", "motion from the current time to 5 minutes ago" and "motion from 5 minutes ago to the current time" to make selection effective. However, this identity provider can prepare questions which do not accord with the selection settings, if necessary. For example, if the user does not move from a certain place for more than an hour, the identity provider cannot prepare any question in accordance with the above selection settings. In such a case, the identity provider prepares questions from the records more than an hour ago.

Also, the user can input a route pattern by sliding a finger (or cursor) on a map to continuously pass three points without the finger (or cursor) being lifted. This movement makes it possible to quickly input a route pattern if the question relates to records several tens of minutes ago. Furthermore, in this case, it is possible to give meaning to the speed of a finger (or cursor) moving between two points. For example, if the user moved from the point P1 to the point P2 by car and then moved from the point P2 to the point P3 by foot, the user can input this route pattern by shifting a finger from the point P1 to the point P2 at a high speed and then shifting the finger from the point P2 to the point P3 at a low speed. These speeds are detected by the terminal and sends to the identity provider to reflect the result in determining the score.

In the case where the terminal is capable of detecting the writing pressure, the terminal also transmits the writing pressure to the identity provider. For example, the user can input a longer staying period in a particular place by pressing this place under a stronger pressure. Conversely, the user can input a shorter staying period in a particular place by pressing this place under a weaker pressure. The identity provider detects the writing pressure and reflects the result in determining the score.

Figure 14:
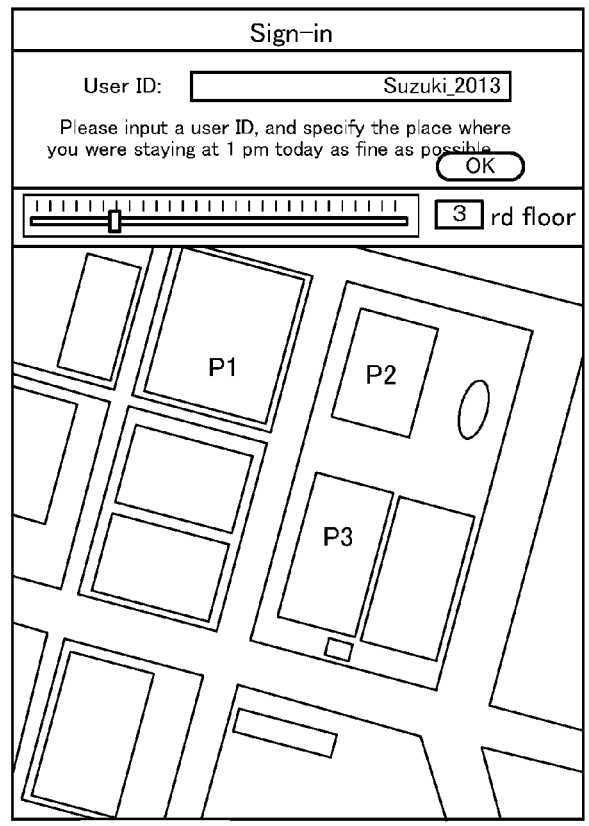
FIG. 14 is a view for showing an answer screen to specify a plurality of places for use in the identity confirmation method according to the embodiment 3 of the present invention.
Figure 18:
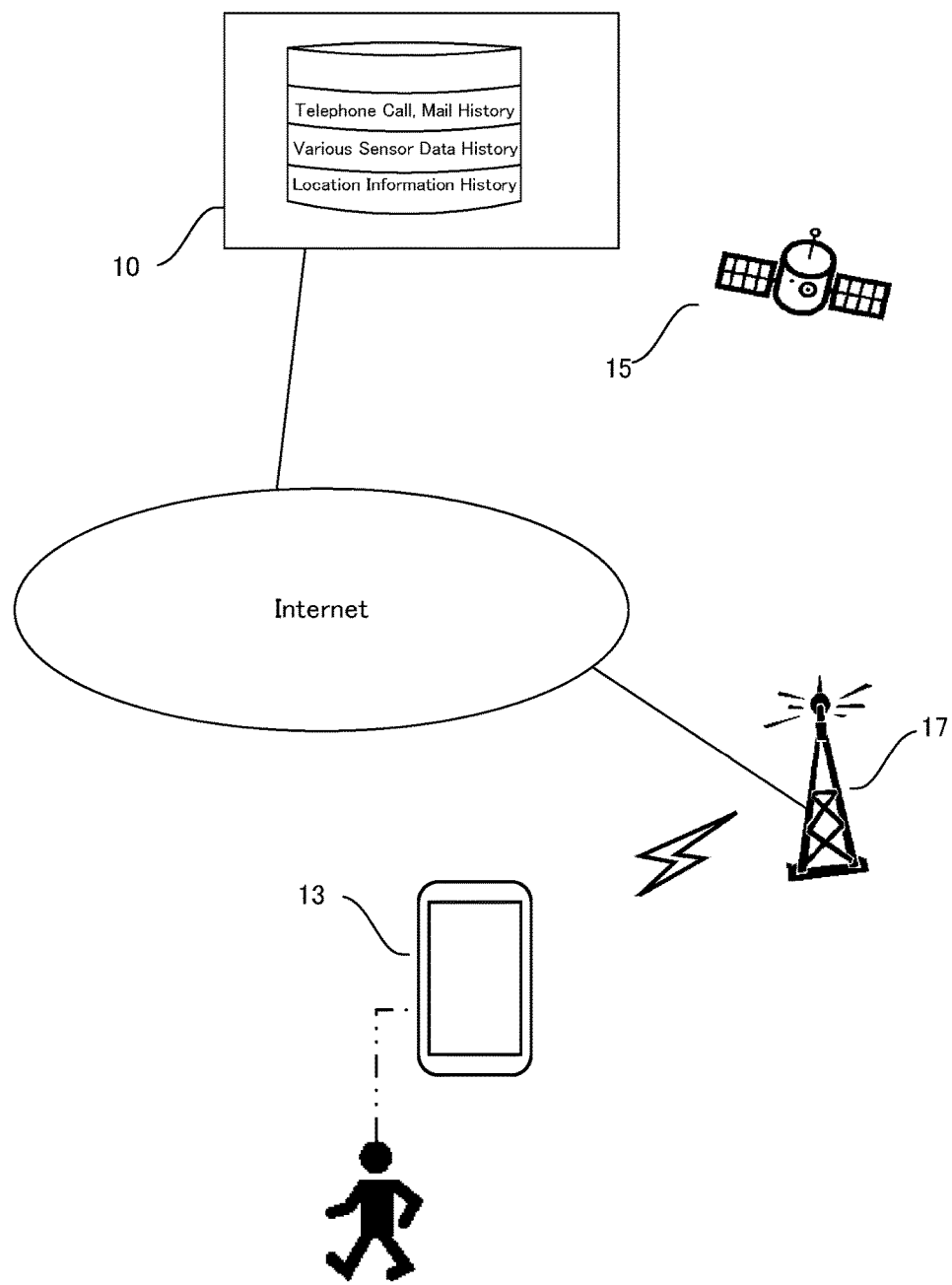
FIG. 18 is a view for explaining a method of collecting life log data in accordance with an identity confirmation method of an embodiment 7 of the present invention.

Furthermore, when specifying a certain building as a staying place, it is possible to add storey information about which floor the user was staying. In this case, as illustrated in FIG. 14, a track bar may be displayed in the screen showing a map in order to makes it possible to input the storey information. After designating the certain building on a map, user can input the storey information by sliding the track bar. If the storey information matches the record, the score is increased.

Furthermore, fingerprint authentication may be performed in combination with the above identity confirmation by the use of a fingerprint sensor which is implemented on the monitor (touch panel) of the terminal through which authentication is performed. In this case, a fingerprint is detected at the same time as a staying place is input with a finger. The authentication is performed by comparing the detected fingerprint with fingerprint information registered in advance to calculate a fingerprint score. The user is authenticated by combining the calculated fingerprint score and the score which is obtained in accordance with the aforementioned identity confirmation. This combination furthermore improves the security of identity confirmation. Alternatively, the fingerprint authentication may be replaced by vein authentication.

[Embodiment 5]

The server of the identity provider of the above embodiments receives current location information of each mobile communication device periodically measured by the resident program installed therein, and manages the current location information as the location information history. However, the mobile communication device may not send current location information to the server of the identity provider, but manages the current location information within the mobile communication device itself.

In this case, the location information history is used to log in the system of the mobile communication device itself. For example, when the mobile communication device is powered up, the mobile communication device performs the identity confirmation as has been discussed above by the use of the location information history, and the user can use the mobile communication device only after the identity confirmation succeeds. Likewise, when the mobile communication device resumes (unlocks) from its stand-by state to its operating state, the mobile communication device performs the identity confirmation to unlock the system, and the user can use the mobile communication device only after the identity confirmation succeeds.

This method is applicable to other instruments than mobile communication devices. For example, while a GPS system is implemented with an automobile, a heavy machine or the like machine which is operated to move by a person, the automobile or machine can be operated only when the identity confirmation succeeds. Namely, identity confirmation is performed by posing questions about the route on which the automobile or machine has moved. Only when the user correctly answers questions, the automobile or machine can be operated (driven). In the case of a working machine, the working history thereof is accumulated, and used to perform the identity confirmation in place of the location information history. For example, the identity confirmation is performed with questions such as "when, what and how much the working machine has produced?". If the user can correctly answer the questions, the identity confirmation succeeds so that he can start up the working machine.

[Embodiment 6]

it is recorded, and, with example 1-example 4, position information of user is always accumulated to a server by transceiver device. However, the location information history of a user is related to the private affairs of the user, so that there seem to be a number of users who hate having an external server accumulate such an action history. Accordingly, this embodiment 6 is implemented to consider user's privacy.

For this purpose, the location information of a user is encrypted at the mobile communication device of the user and transmitted to the server. In what follows, the method of encrypting the location information and the usage of the location information will be explained in details with reference to FIG. 15 through FIG. 17. A user who wants to use this identity confirmation method has to download a resident program from the server of the identity provider and install the resident program in a mobile communication device carried by the user in the same manner as in the aforementioned embodiment 1.

When this resident program is used, an encryption key is determined as an initial setting. This encryption key can be generated by, for example, processing a character string input by a user with a hash function such as SHA-1 and extracting upper 128 bits. Alternatively, the resident program can generate a 128-bit random number as an encryption key. Once the encryption key is generated, the user need not be aware of the function thereof.

The resident program then starts periodically measuring the current location information to obtain latitude and longitude data. This latitude and longitude data is 64-bit data containing a latitude of 32 bits and a longitude of 32 bits, encrypted with the encryption key, and transmitted to the server of the identity provider together with time information indicative of the current time.

As illustrated in FIG. 15, the encryption method is performed in the following way. First, the current time in the form of a 64-bit Unix (registered trademark) time is concatenated to the 128-bit encryption key to create 192-bit data. The 192-bit data is processed by a hash function (SHA-1 in this example) to generate a hash value of 160 bits. The upper 64 bits of the hash value are used as an encryption bit sequence. The latitude and longitude data of 64 bits is exclusive ORed with the encryption bit sequence to generate encrypted latitude and longitude data. This encrypted latitude and longitude data is transmitted to the server together with the current time.

In accordance with this encryption method, different current times are added to all the latitude and longitude data so that, even if records are transmitted from the same latitude and longitude place, they are transmitted as entirely different data items. Accordingly, as long as the encryption key is not available, the latitude and longitude information stored in the server simply appears collection of random numbers which are not correlated.

This 128-bit location information record contains current location information (true current location information). In addition to this, the resident program generates 128-bit location information records containing false current location information. The false current location information is generated in the same manner as the true current location information except that false latitude and longitude are used in place of the true latitude and longitude corresponding to the true current location information.

The false location information record is transmitted alternately with the true location information record. However, the server can determine whether each received location information record is true or false. For example, the resident program transmits the true location information record with a UNIX time which is an even number, and the false location information record with a UNIX time which is an odd number. Namely, the resident program transmits a location information record after incrementing its UNIX time by one second if necessary. In this case, the true location information record and the false location information record are alternately transmitted at intervals of five minutes.

The server receives and distinctively accumulates the true and false location information records in association with the user ID corresponding thereto. Each of the true location information record and the false location information record contain a time field and a latitude/longitude field for storing encrypted latitude/longitude data.

Since these records are arranged at intervals of five minutes, the time field can be dispensed with in a practical implementation. Specifically describing as illustrated in FIG. 16, after receiving the first location information record, the Unix time thereof is written into the first address (0th address) indexed in units of 64 bits. In this example shown in FIG. 16, a UNIX (registered trademark) time of 0x5274973a is written into the first address. Meanwhile, in FIG. 16, the latitude and longitude values are illustrated in plaintext for the sake of clarity in explanation. The data actually stored in the server of the identity provider is encrypted data which appears meaningless bit strings of random numbers.

The latitude and longitude values of the first location information record are written into the next 1st address as a true location information record. Of the 64-bit storage region corresponding to the N-th address (N>0), the upper 32-bit half is used to store a latitude value and the lower 32-bit half is used to store a longitude value. The latitude and longitude values received after 5 (N+1)th minutes are written into the N-th address. If no location information record is received from the mobile communication device, 0 is stored in the address corresponding to the current time. The location information history thereby consists of true location information records stored in odd address and false location information records stored in even address.

Next, the identity confirmation method by the use of this server will be explained. First, the user accesses a log-in dialog of the service provider through the browser as shown in FIG. 6. The log-in dialog includes a form in which the user can enter a user ID. When the user presses a send button after entering the user ID, an authentication request is redirected to the identity provider. This authentication request is transmitted to the identity provider together with the user ID, the URL of this service provider and an authorization ID.

This authorization ID is issued by the service provider and associated with the user ID and the identity provider. Also, the authorization ID is effective only for a predetermined effective period (for example, twenty minutes). The user has to finish the log-in process within this effective period. The above steps are the same as those of the identity confirmation method according to the embodiment 1. Then, an authentication process is performed between the browser and the identity provider as follows.

First, the identity provider randomly extracts a true location information record from an odd address A of the location information history corresponding to the user ID. Also, the identity provider extracts four false location information records from the addresses A+1, A+3, A+5 and A+7 of this location information history. The extracted five location information records are shuffled at random in order that the true location information record cannot be determined from the position. These records are transmitted to the mobile communication device together with the Unix time of the true location information record. The identity provider cannot know the latitude and longitude of the true location information record which are encrypted, but can know which true location information record is the true location information record. However, the identity provider saves the position of the true location information record in the transmitted five records which are shuffled.

The mobile communication device receives and decrypts the five location information records. As illustrated in FIG. 17, the decryption method is the reverse of the encryption method as described above. Namely, the encryption key which is saved in the mobile communication device is concatenated with the Unix time which is received, and processed by the hash function which is used when encrypting the location information records to generate the 64-bit encryption bit sequence. The latitude and longitude data of 64 bits as encrypted is exclusive ORed with the encryption bit sequence to generate the latitude and longitude data as plaintext.

Multiple-choice questions are generated on the basis of the decrypted latitude and longitude data in the same manner as in the embodiment 1. However, in this embodiment 6, the generation of the questions are performed by the resident program in the mobile communication device side. The user of the mobile communication device answers the questions as to which record is correct to the identity provider, and the mobile communication device transmits this answer to the identity provider. For example, if the user can correctly answer three or more out of the five questions, the user is authenticated in the same manner as the identity confirmation method according to the embodiment 1.

In the aforementioned identity confirmation method, four false location information records are selected after extracting the true location information record. Accordingly, when the resident program of the mobile communication device transmits a false location information record after transmitting a true location information record, the location contained in the false location information record is selected at random to be substantially distant from the location of the previous four true location information records. For this purpose, the previous five true location information records (latitude and longitude values) have to be saved in the mobile communication device. Any of the four false location information records shall therefore not be a correct answer by chance.

On the other hand, the data stored in the server is a memorandum record of the action history of each user, and therefore might be a useful information source for some user. The server may provide a location information record which a user desired to obtain by designating the date and time thereof. The location information history can thereby be memorandum records for users. Besides memorandum records, there may be applications of the location information history from which a user can obtain own location information whenever.

It is therefore possible to avoid personal information leakage risk by transmitting latitude and longitude information only after encryption and preserve user's privacy such as action histories. That is, the data stored in the server appears for persons other than that user only meaningless bit strings of random numbers from which no information can be obtained. Even if the encryption key is leaked to a third person, the third person can only decrypt questions transmitted from the server, but cannot know correct answers. Accordingly, fraudulent login is impossible.

As apparent from the above description, the third person has to clear two hurdles in order to the location information history as plaintext. First, the third person has to raid into the server in some way and get the database of the user. The encrypted latitude and longitude data can be obtained by this step. Next, the third person has to raid into the mobile communication device of the user, determine the location of the encryption key which is used by the resident program, succeed in accessing the location, and get the encryption key. After clearing the above two hurdles, the third person can the true location information records. Since it is hard to clear even either one of the two hurdles, it is almost impossible to clear both so that personal information is sufficiently protected.

[Embodiment 7]

This and subsequent embodiments relate to identity confirmation methods and identity confirmation systems which utilize not only the location information history but also general life log data in a broad sense. The currently available smartphones incorporate a variety of functions including various sensors. In this embodiment, particularly, information directly obtained from the smartphone is used to performs identity confirmation. In what follows, the embodiment will be explained in detail with reference to FIG. 18 through FIG. 25.

In the aforementioned embodiment, the location information history server serves as an identity confirmation server. However, more generally in this embodiment, a life log server 10 serves as an identity confirmation server which is persistently connected to the Internet. Namely, a user carrying a smartphone (mobile terminal) 13 transmits a variety of activity records (life log) directly obtained by the smartphone to the identity confirmation server 10 through the Internet. The identity confirmation server 10 accumulates and manages this life log as the life log server 10, and performs identity confirmation (authentication) of each user on the basis of the content of the life log of the each user.

The hardware configuration of this identity confirmation server 10 is similar to that of a computer for implementing a usual server, and implemented with a program installed for performing processes which will be explained below in detail. Meanwhile, in this case, the identity confirmation server 10 serves also as a life log server. However, from the technical view point of the present invention, it is not important whether or not separate servers are provided so that a plurality of servers may divide respective roles of the services. For example, a life log server may be provided as a separate server from the identity confirmation server 10, so that the identity confirmation server 10 can inquire the life log server, if necessary, about a life log necessary for authentication.

Sensors incorporated in usual smartphones include, in addition to a GPS system, an acceleration sensor, a gyro sensor (three-axis gyroscope), an azimuth sensor, an atmospheric pressure sensor, a temperature sensor, a proximity sensor, an illuminance sensor and so forth. History data of these sensors is acquired and stored as life log data.

The acceleration sensor measures acceleration rates in three directions, i.e., lateral, depth and heght directions, and therefore can determine the direction of gravity so that it is possible to acquire the inclination angle (inclination in the vertical direction) and the rotation angle (inclination in the lateral direction) of the smartphone body. The orientation (posture) of the smartphone can be determined these angles and the azimuth angle measured by the azimuth sensor which is implemented with an electronic compass. On the other hand, the gyro sensor can detect the rotational speed of the smartphone 13. Namely, with respect to each of the three axes of a three-dimensional space, the rotational speed can be measured in rad/s (radians per second) with the center of the smartphone 13 as an origin.

However, different smartphones may have different types of sensors incorporated therein. Also, measurement might be difficult in some situation. Only values which can be measured are acquired and managed. Values which cannot be measured may be substituted by corresponding data obtained by alternative means. For example, as described below, if the atmospheric pressure sensor is not available, an atmospheric pressure can be obtained by accessing a server which provides meteorological information with reference to the current address information. Also, when GPS cannot be used, triangulation with base stations or a WIFI base station can be used to obtain the current position.

In the case where data is obtained by alternative means in place of the measurement means of the smartphone 13 itself such as a sensor, the reliability is considered to be somewhat low. The reliability of data can be accurately evaluated by recording the means of obtaining data.

Next is specific description of a life log acquiring managing method which is performed by the identity confirmation server 10. A utility program (resident program) installed in the smartphone 13 periodically acquires the current location information of the smartphone 13 on the basis of a base station 17 or a GPS utilizing satellites 15. At the same time, output values of built-in sensors, i.e., an acceleration sensor, a gyro sensor, an azimuth sensor, an atmospheric pressure sensor, a temperature sensor, a proximity sensor and an illuminance sensor, are acquired and stored in a history database.

For example, this history database is used to store the recording date, the latitude and longitude as the current location information, the Cell-ID identifying the base station 7 which was communicating with the smartphone 13 when recording, and the receiving sensitivity. The history data is accumulated and managed in the same manner as described in the above embodiments. In the case of this embodiment, there are further provided fields for storing acceleration, angular acceleration, inclination, atmospheric pressure, azimuth angle, temperature, proximity and illuminance data. In FIG. 19, while the current location information is stored in one field, the data stored in this field consists of a plurality of elements as described above. This is true for other data.

The current position is measured at intervals of several minutes (for example, every five minutes in this case) to acquire and store the current location information. At the same time, the output values of the gyro sensor, the azimuth sensor, the atmospheric pressure sensor, the temperature sensor, the proximity sensor and the illuminance sensor are acquired and stored.

Separately from that, the output data of the acceleration sensor is regularly monitored. When a change is observed in the acceleration data, the timely variation thereafter of the output data of the acceleration sensor is stored. For example, no data is acquired when the smartphone 13 is placed on a desk or when the user is sleeping. Also, when a change is observed in the acceleration data, not only the output signal of the acceleration sensor but also the timely variations of the output signals of the angular acceleration sensor, the azimuth sensor, the proximity sensor and the illuminance sensor are measured. Then, the action of the user carrying the smartphone 13 is estimated and recorded.

Specifically, the action is estimated on the basis of the timely variations of the output signals of these sensors, and divided into states such as stationary, indoor working, walking, bicycle traveling, riding a vehicle, enjoying sports, . . . , sleeping and so forth. These states are given numerals such as 0, 1, 2, 3, 4, 5, 6, . . . which are recorded as motion codes (refer to FIG. 20).

In this embodiment, a new record is added when the motion code is changed. For example, in the case where the user rides a subway for 20 minutes and walks after getting off the subway, one record is added with a motion code corresponding to "riding a vehicle" in the time when he got on the subway, and a next record is added with a motion code corresponding to "walking" when he got off the subway and started walking. Also, the current location information is acquired and recorded together with each record.

The data of the atmospheric pressure sensor is detected and recorded as a pressure in the current position. For example, this data can be utilized as accompanying information relating to the weather of the place where the user is staying. In addition to this atmospheric pressure data, atmospheric pressure data obtained from a service in the Internet is recorded as associated data. Such services include, for example, a municipality level service publicized by the meteorological bureau.

Furthermore, there is user-level detailed information available as crowd-sourced services. For example, the project "PressureNET" receives the data of an atmospheric pressure sensor and a GPS device incorporated in a smartphone carried by each user, and provide realtime atmospheric pressure information on each place on the basis of the received data. If the smartphone 13 does not incorporate an atmospheric pressure sensor, this atmospheric pressure information corresponding to the current position is recorded. Even if the smartphone 13 incorporates an atmospheric pressure sensor, this atmospheric pressure information may be recorded in addition to the data actually detected by the sensor.

Meanwhile, some crowd-sourced service permits each user to input data simply by tapping an icon corresponding to the weather of the place the each user is staying. In this case, current weather can be obtained almost on a real time base. This weather information (fine, light cloudy, cloudy, rainy, hardly rainy etc.) is acquired and recorded (weather field in the figure). However, such information on the Internet may be acquired only when appropriate in order to decrease the data amount of the history database.

The temperature sensor tends to output a higher temperature than the outside air temperature. This is because of the influence of heat generated by the smartphone 13 itself and by the body of the user. Accordingly, the data is used as auxiliary data for estimating the outside temperature, estimating the usage of the smartphone 13, or estimating where the smartphone 13 is placed, for example, in a pocket, on a desk or the like. Also in this case, in addition to this temperature data, temperature data obtained from a service in the Internet is recorded as associated data.

The output of the proximity sensor indicates whether or not there is some object in the vicinity (for example, within several centimeters) of the position (for example, the front of the screen) of the proximity sensor of the smartphone 13. Accordingly, for example, it is used to check whether or not the user is putting the smartphone 13 to his ear. However, the data can be used as auxiliary data together with the data of the temperature sensor for estimating the usage of the smartphone 13, or estimating where the smartphone 13 is placed, for example, in a pocket, on a desk or the like. The data can be used together with the history of calling states for determining whether or not a hands-free telephone conversation was performed.

The data of the illuminance sensor indicates the ambient brightness. Accordingly, the information about the situation where the smartphone 13 is placed can be obtained. Namely, the information about being used under the blazing sun, being used in a room, being placed in a pocket, being placed in a dark environment during sleeping and so forth can be obtained.

Furthermore, data saved as life log data includes the history of invoking applications, the history of changing favorite websites registered in a browser and the history of browsing websites by the user with a personal computer and the smartphone 13. In this case, a corresponding utility program is installed in the personal computer to transmit the respective history data to the identity confirmation server 10. However, since the memory relating to such data of the user himself is somewhat vague, only simplified authentication is performed for example by querying the site which is frequently browsed and so forth.

Such life log data is stored in a database as shown in FIG. 21. One record is generated when one operation is performed. Each record consists of date, time, operation code and operation data. The operation code is input as a code which distinguishes between a personal computer and a smartphone and represents an operation such as browsing a website, invoking an application, changing the favorites and so forth. On the other hand, the operation data is data indicative of, for example, an URL which is browsed, the name of an application which is invoked, an URL which is registered in or deleted from the favorites.

Furthermore, the history data relating to the call records of the smartphone 13 is transmitted to the identity confirmation server 10. With respect to this call records, not only information about the speech partner but also the speech content are recorded and stored together with text information obtained by speech recognition.

Such life log data is stored in a database shown in FIG. 22. Each time one call is performed one record is generated, and each record consists of data, time, speech time, name of speech partner, telephone number, success/failure of calling, pointer to speech content (speech recognition text) and pointer to speech record data. The speech content and speech record data are stored in order to be accessed with pointers to the respective data.

However, the speech data including content is substantially private data. Accordingly, it is preferred to store partial data in accordance with user settings rather than the above described original data. For example, as described below, a dialog box shown in FIG. 37 is presented in order that a user can arbitrarily select data items to be recorded. In the figure, conversation time is the time when conversation is started anew. Also, conversation period is the period for which conversation is continued, so that if this option is selected the conversation time is automaticaly selected. Destination information may be the telephone number of the speech partner, or the registration name of the speech partner.

Furthermore, the transmission and reception history of email of the user is stored as life log data. This transmission and reception history consists of respective elements of each message source, i.e., transmission date, reception date, the names of recipient and sender, mail address, title, message body and attachment which are searchably stored in a database.

Such life log data is stored in a database shown in FIG. 23. Every time when mail is transmitted or received, one record is generated, and each record consists of date, time, sender/recipient, mail address and pointer to message body. The message body is stored in order to be accessed with a pointer.

Next, a specific example of identity confirmation by the use of the above life log data will be explained. Incidentally, the process flow is similar as in the case of the embodiment 1 or the embodiment 2 described above except for the contents of questions which are explained below. In the case of the above life log data, a user does often not remember too past data. Questions for authentication are provided from data which is not older than several days before. Answers to these questions are scored, and if the score result reaches a predetermined level the identity confirmation succeeds.

In the case of the examples shown in FIG. 24 and FIG. 25, questions are provided from the yesterday's data of the life log. These questions require selection of correct items. Correct answers of many questions are multiple selections. Since there are six items for one question, there are little possibility that all the six items are correctly selected/unselected by chance ($2^{-6}$ when selected at random). However, similar questions may be asked in sequence if necessary.

Meanwhile, even when all the six items are not correctly selected/unselected, the answer may be accepted as a correct answer if five items are correctly selected/unselected. Anyway, since a different question is asked every time, true/false of each of six item cannot be known. Selected items are visually distinguished by changing the design of the frame.

These items are randomly generated on the basis of the above life log data. For example, from among records which apparently indicates rain on the basis of atmospheric pressure data, temperature data and weather data, if there is a record which apparently indicates that the user went out on the basis of acceleration data and angular acceleration data, a true item that "out in a rainy day" is extracted. On the other hand, if there is a record which apparently indicates that the smartphone 13 was not used on the basis of combination of acceleration data and angular acceleration data, a true item that "smartphone was not used" is extracted. Furthermore, if there is a record which apparently indicates that the smartphone 13 was not taken out on the basis of combination of data of the proximity sensor and illuminance data, a true item that "smartphone was not taken out from a pocket/bag" is extracted. One question can be created by extracting ten true items as described above, randomly generating the same number of false items, and randomly selecting six items from the total twenty items.

[Embodiment 8]

Figure 26:
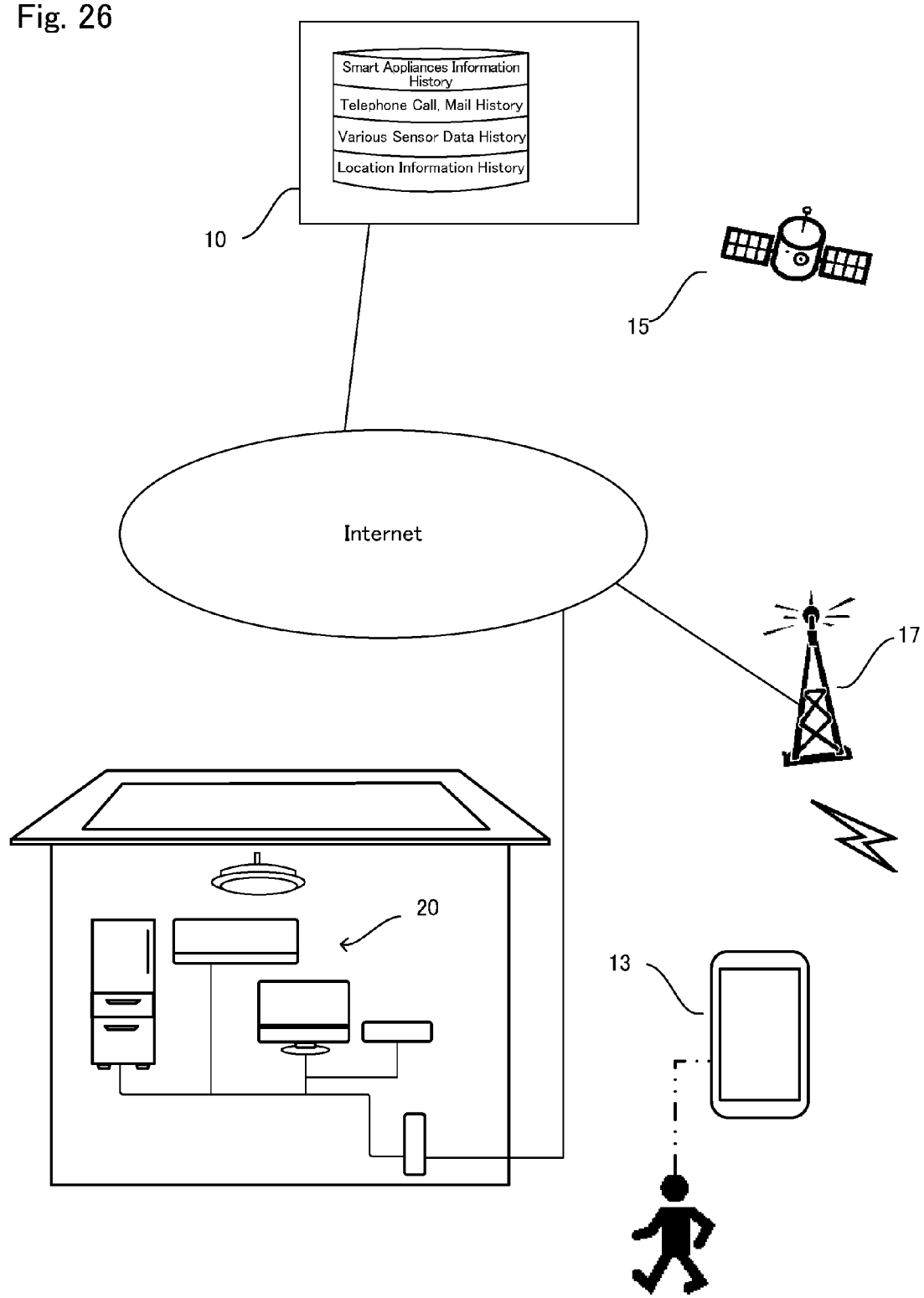
FIG. 26 is a view for explaining a method of collecting life log data in accordance with an identity confirmation method of an embodiment 8 of the present invention.

While the history data acquired and managed is centered on the smartphone 13 in the case of the embodiment 7, life records in a house are acquired and managed as life log data in the case of this embodiment 8. Specifically, as illustrated in FIG. 26, the life log data acquired and managed includes the history data relating to operation and management of electric appliances 20, which are connected to networks, called smart appliances.

In this case, the smartphone 13 is used as the operation panels of the electric appliances. The electric appliance is manipulated usually through electric appliance itself in the past. However, if the smartphone 13 is used to operate the electric appliance, there are many advantages. For example, it is possible to change the display of an operation panel in accordance with the current situation, display information retrieved through the Internet, update the functionality and so forth. Also, there are available a large and high definition screen in general so that the electric appliance becomes user-friendly.

The life log data of the smart appliances and the life log data of the sensors of a smartphone can be used not only separately from each other but also in association with each other. For example, these two types of life log data can be associated to makes it possible to obtain information such as "the temperature of the air conditioner is set up to a certain degree at the station before coming home at PM8", "the bath is switched on after telephone conversation with the family".

Also, the combination of the data of the azimuth sensor and the data of the acceleration sensor can be used to detect which direction the smartphone 13 is directed. For example, when an electric appliance is operated by the smartphone 13, the user directs the smartphone 13 toward the electric appliance as much as possible. In this case, the direction of the smartphone 13 is associated with the operation history in order that the electric appliance toward which the smartphone 13 is directed can be estimated from the association. This association is learned and stored.

By this learning, only when the smartphone 13 is directed toward an electric appliance, the initial screen of the remote control can be determined. Specifically, the detection data of the acceleration sensor is monitored. When the detected acceleration changes, the direction of the smartphone 13 is calculated on the basis of the output of the azimuth sensor, and then a remote control screen for controlling the corresponding electric appliance is automatically displayed.

The utility program of this embodiment installed in the smartphone 13 transmits operation information (operation history) of electric appliances (smart appliances) obtained from the smartphone 13 to the identity confirmation server 10 through the Internet together with various data obtained from the electric appliances. On the other hand, the identity confirmation server 10 is implemented with a program to receive data transmitted from the smartphone 13, store and manage the data in a database.

Such electric appliances in a house include all the electric appliances connectable to a network, for example, an air conditioner, a refrigerator, a television, a video recorder, a washer dryer, a rice cooker, and a microwave oven. In addition to this, the history data from an entrance door key, an automobile and the like connectable to a network is collected and managed in the same manner. For example, information about a time of coming home and a vehicle's running history may be collected.

These home electric appliances can communicate with the smartphone 13 through a wired LAN (Ethernet (registered trademark) in many cases) or a wireless LAN such as WIFI. Also, these home electric appliances can be connected to the Internet through the wired or wireless LAN without through the smartphone 13 to communicate with the identity confirmation server 10.

In the case of a network compatible refrigerator, history data to be collected includes changes of a set temperature by the smartphone 13 as a remote controller, opening/closing of a door and the state of stored foods and its changes. Meanwhile, history data can be collected by transmitting data directly from the refrigerator to the identity confirmation server 10 through the Internet, or by transmitting data directly from the smartphone 13 to the identity confirmation server 10 through the Internet without through the refrigerator. The later case is, for example, when the smartphone 13 is used as a remote controller to operate the refrigerator.

It is difficult to automatically detect and record the status of foods stored in a refrigerator and its changes. In many cases, thereby, a user manually input data. If QR codes (registered trademark) are available, the input operation becomes somewhat easy. Anyway, the information manually inputted is transmitted to the identity confirmation server 10 which manages this information. In this case, even in the case of a refrigerator which is not connected to a network, the history data relating to the situation of stored foods can be transmitted from the smartphone 13 to the identity confirmation server 10 for management.

In the case of a network compatible air conditioner, the smartphone 13 can be used as a remote controller to change the set temperature, perform remote control from the outside of a house, set timer reservation, perform management of electricity costs and so forth. The operational history of the air conditioner by the smartphone 13 is transmitted to the identity confirmation server 10 for management.

Furthermore, the current room temperature and the driving condition are transmitted to the smartphone 13 from the air conditioner. This air conditioner side information is further transmitted from the smartphone 13 to the identity confirmation server 10 which manages this information. Of course, this air conditioner side information can be directly transmitted to the identity confirmation server 10 from the air conditioner through the Internet.

In the case of a network compatible washer dryer, the smartphone 13 can be used as a remote controller to control operation of the washer dryer. Also, the smartphone 13 can receive notification of the end of washing, prediction of failure, notification of clogging of a dry filter through the Internet. These operational information and notification information are transmitted to the smartphone 13 from the washer dryer. This washer dryer side information is further transmitted from the smartphone 13 to the identity confirmation server 10 which manages this information. Of course, this washer dryer side information can be transmitted directly from the washer dryer to the identity confirmation server 10 through the Internet.

In the case of network compatible rice cooker and microwave oven, the smartphone 13 can be used as a remote controller to control operations of the rice cooker and microwave oven. Also, the smartphone 13 can receive notification of the end of cooking, notification of consumption of electricity and notification of failure prediction through the Internet. These operational information and notification information are transmitted to the smartphone 13 from the rice cooker and microwave oven. This rice cooker and microwave oven side information is further transmitted from the smartphone 13 to the identity confirmation server 10 which manages this information. Of course, this rice cooker and microwave oven side information can be transmitted directly from the rice cooker and microwave oven to the identity confirmation server 10 through the Internet.

There are commercially available lighting apparatuses which can be controlled by the smartphone 13. The utility program of the smartphone 13 is implemented with such controlling functionality. Particularly, in the case of LED lighting apparatuses, brightness and color tone can be adjusted. The timer function can be implemented easily. If there is no timer function in the lighting apparatus itself, a timer function can be implemented in the utility program. Also, in this case, the operations of turning on/off the lighting apparatuses, adjusting brightness and color tone and setting a timer are transmitted to the identity confirmation server 10 as life log history data.

The life log data of the above electric appliances is saved in a database as illustrated in FIG. 27. When an operation is performed, one record is generated. Each record consists of a date, a time, an appliance code indicating the appliance, an operation code which is depending on the appliance, and operation data. For example, when a timer is set to an air conditioner, a record which is generated consists of 7 as the appliance code of air conditioner, 12 as the operation code for a timer to be invoked at a set time, and 0500 as the operation data indicating a set time of AM5.

Next, a specific example of identity confirmation making use of the above life log data will be explained. Also in this case, the process flow is similar as in the case of the embodiment 1 or the embodiment 2 described above except for the contents of questions which are explained below. In the case of the above life log data, a user does often not remember too past data. Accordingly, questions for authentication are provided from data which is not older than several days before.

In the case of the examples shown in FIG. 28 and FIG. 30, questions are provided from the yesterday's data of the life log. These questions require selection of correct items. Correct answers of many questions are multiple selections. Since there are six items for one question, there are little possibility that all the six items are correctly selected/unselected by chance. However, similar questions may be asked in sequence if necessary. Questions are prepared in the same manner as in the embodiment 7.

Incidentally, while this embodiment mainly uses data of smart appliances, the reliability can be improved by combining the data with data generated by the smartphone. Namely, it is preferred to intermix the questions of FIG. 24 through FIG. 28 and the questions of FIG. 29 and FIG. 30. For example, intermixed questions can be created as illustrated in FIG. 31 and FIG. 32.

Furthermore, the item "traveled by automobile" can be generated on the basis of the data from an automobile itself, but can be generated also on the basis of the data from the smartphone such as acceleration data, angular acceleration data and the motion history data. Also, it is possible to make more accurate the interpretation of the life log by associating data of smart appliances and data of the smartphone with each other.

[Embodiment 9]

In this embodiment, identity confirmation is performed by the use of a program viewing history as life log data such as viewing and recording programs with a television and a video recorder in addition to the life log data as described in the above embodiments. History data which is more effective for authentication can be obtained in the case of a television and a video recorder. This is because what is viewed is not easily forgotten. It is assumed here that the smartphone 13 can be used as a remote controller of a television and a video recorder through a LAN by the utility program installed in the smartphone 13.

The television and video recorder of this embodiment are implemented with a program with which the television and video recorder can accept LAN commands, which are transmitted from the utility program of the smartphone 13 through the LAN, in the same manner as the television and video recorder accepts operation commands transmitted from a usual infrared remote controller. In addition to this, the television and video recorder notifies the utility program of the smartphone 13 of the own states and operations such as recording reservation settings, recording results or other operations than those which are not performed by the smartphone 13.

With digitization of broadcasting, electronic program information of a predetermined format is transmitted through broadcast radio waves. The identity confirmation server 10 acquires and stores this electronic program in a database, so that each record of the program viewing history of each user can consist of information about a channel number, a date and a time. The program information (title, abstract, performers etc.) can be extracted from the database with reference to the channel number, date and time.

Accordingly, each record of the program viewing history consists of an operation time and an operation code. The operation code is a 4-byte code indicative of an operation of a television or video recorder. The higher two bytes indicates channel information, and the subsequent two bytes indicates a type of operation. The higher four bits of the channel information indicates a type of broadcast, and the lower 12 bits indicates a channel number. The type of broadcast indicates a type such as digital terrestrial broadcast (0001b), digital BS broadcast (0010b), CS broadcast (0011b), cable television (0100b) and the like. FIG. 33 is a schematic view for showing a table which corresponds to a database of this program viewing history.

The type of operation is represented by a numeral distinctively indicating one of operations such as powering on/off of a television or video, changing a channel, starting recording, terminating recording, setting start of recording, setting end of recording and so forth. For example, the operation of setting recording reservation is represented by a numeral consisting of upper two bits which can take on 10 (reservation of starting recording) or 11 (reservation of ending recording), and lower 14 bits (recording starting time or recording ending time) which can take on an offset (the number of seconds) from the current time corresponding to the date and time fields. The operations other than setting recording reservation are represented by numerals whose uppermost bit is 0.

Next, a specific example of identity confirmation by the use of the above life log data will be explained. Incidentally, the process flow is similar as in the case of the embodiment 1 or the embodiment 2 described above except for the contents of questions which are explained below. FIG. 34 through FIG. 36 show specific examples of questions which are used for identity confirmation by the use of the above program viewing history. The questions shown in FIG. 34 and FIG. 35 are six-choice questions to select program titles. On the other hand, FIG. 36 shows a question for asking how to view a certain program by presenting detailed information thereabout. In this case, since detailed information is presented, a user is expected to answer the question even if the question relates to somewhat old information.

Incidentally, since the identity confirmation server 10 serves also as a life log server, a user can freely search own life log, and retrieve and manipulate data after identity confirmation. The life log data is substantially comprehensive so that the data is particularly useful for the user himself.

[Embodiment 10]

In this embodiment, considering user's privacy, life log data is encrypted and then transmitted to the identity confirmation server 10. The encryption system of this embodiment is substantially similar to that of the embodiment 6 in their basic structure, but constructed more generic. The basic process is as follows.

A smartphone or a personal computer transmits true and false records always in pairs so that the server can determine whether each record is true or false. A true record can be generated from the life log data as described above. On the other hand, a false record can be generated by preparing a record which is substantially different from the true record. The false record and the true record are encrypted respectively and transmitted in this order. The server cannot know the content thereof but can know which record is ture on the basis of the order of reception.

Accordingly, in this case, the data amount to be managed by the server is doubled. The identity confirmation server 10 stores and manages the received false and true records, which are encrypted, as they are. Also, as illustrated in FIG. 38, a table is created in which the date and time when each record is received are associated with a pointer to access information corresponding to the each record. The former record and the latter record with the same date/time are a false record and a true record respectively.

When identity confirmation is performed, the identity confirmation server 10 extracts six records at random and transmits them to a smartphone or a personal computer of a user. The records are received and decoded in the user side, for example, as "made telephone conversation with Mr.* at * o'clock for *minutes", and displayed in the form of a question as described above. The answer of the user is transmitted to the identity confirmation server 10 and scored to determine the result of identity confirmation. This is similar to the process of the above embodiment without encryption except that the identity confirmation server 10 cannot know the content of each record.

It is therefore possible to avoid personal information leakage risk by transmitting information only after encryption and preserve user's privacy in the same manner as in the embodiment 6. That is, the data stored in the server appears for persons other than that user only meaningless bit strings of random numbers from which no information can be obtained. Even if the encryption key is leaked to a third person, the third person can only decrypt questions transmitted from the server, but cannot know correct answers. Accordingly, fraudulent login is impossible.

In the case of the conventional encryption techniques, once an encryption key is leaked, another person can be in the same place as a proper user and can access all the information of the user. However, in the case of the identity confirmation method of this embodiment, even if an encryption key is leaked, the another person fails authentication because of absence of memory which the user has and cannot access the information. Needless to say, authentication has to be passed in order to acquire life log data.

As apparent from the above description, there are two security hurdles which have to be cleared in order that a third person impersonates the user and passes identity confirmation. First, the third person intrudes the server and acquires the data of a target user. The encrypted data can then be acquired. Next, the third person intrudes the mobile communication device of the user, identifies the location of the encryption key which is used by the resident program, accesses the location, and acquires the encryption key. The data acquired from the server can be decrypted by the encryption key to obtain the plaintext. Even only one of the two hurdles is quite difficult to clear so that it is extremely difficult to clear the both, and thereby the user data is believed to be sufficiently kept secret.

[Embodiment 11]

In this embodiment, biometric information such as pulse rate, respiration rate and body temperature is stored and managed as part of life log data. Some of biometric information can be collected only with a smartphone. However, a separate device is used in this example. While a general wearable terminal can be used for the same purpose, it is preferred to use a dedicated terminal which is specialized to collect biometric information. Namely, this terminal measures biometric information directly from the body of a user, and transmits the data of the biometric information to a smartphone by wireless communication. Receiving the data, the smartphone transmits the data to the identity confirmation server, if necessary, after processing the data.

One example of such terminals is a T-shirt in which are incorporated an electrocardiograph, a respiration sensor and a temperature sensor. The smartphone can acquire raw data from the T-shirt through Bluetooth (registered trademark), and calculate and acquire biometric information such as a heart rate, a heart rate zone, change of the heart rate, a respiration rate, depth of respiration, body temperature and so forth. Also, in combination with the output signals of the acceleration sensor and the gyro sensor of the smartphone, other biometric information can be calculated and acquired such as consumed energy, activity intensity, the number of steps, consumed calorie and so forth.

In this case, the smartphone calculates biometric information from raw sensor information, and transmits the biometric information to the identity confirmation server 10 as life log data. Alternatively, the smartphone can transmit raw sensor information to the identity confirmation server 10 which calculates biometric information from the raw sensor information.

Also in this case, the measurement of the above biometric information is not always performed, but is started when there is a change in acceleration data. Namely, the biometric information is recorded as variation patterns in association with variation of user's activity type estimated from other life log data (i.e., stationary, indoor working, walking, bicycle traveling, riding a vehicle, enjoying sports, . . . , sleeping and so forth).

Figure 39:
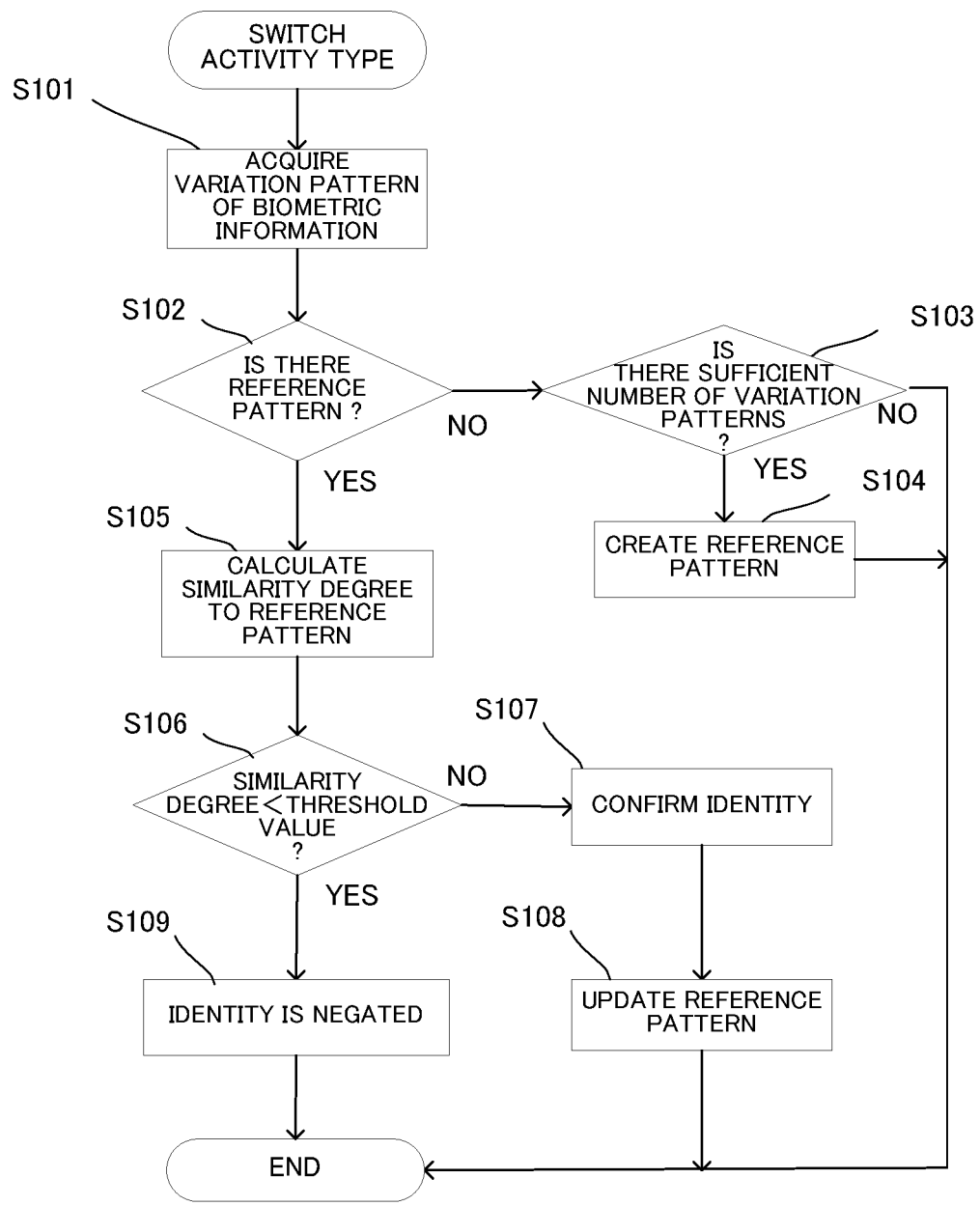
FIG. 39 is a block diagram for explaining a process performed when user's activity type is switched in accordance with the identity confirmation method of an embodiment 11 of the present invention.

In what follows, the process when user's activity type is switched will be explained with reference to FIG. 39. Namely, in step S101, the variation pattern of the biometric information is acquired for a predetermined period (for example, ten minutes) just after switching the activity type. More specifically speaking, biometric information is measured at each five seconds for a ten second period which is shifted by five seconds, such as ten seconds from the switching, ten seconds from five seconds after the switching, ten seconds from ten seconds after the switching . . . . As a result, 120 variation patterns are obtained in this manner. These biometric information variation patterns are associated with the switching of the activity type, for example, "walking" to "stationary", and recorded in the identity confirmation server 10 as life log data. Incidentally, when the activity type is "stationary" a certain period (for example, ten minutes) after switching from "walking" to "stationary", the biometric information in the stationary state is calculated and acquired. Meanwhile, this period can be readily adjusted.

After collecting a sufficient number of variation patterns for each switching of the activity type (step S103: YES), a representative biometric information variation pattern is generated as a reference pattern (step S104) for each switching of the activity type. Also, after generating a reference pattern ((step S102: YES), each time a variation pattern corresponding to the reference pattern is collected, a similarity degree with the reference pattern is calculated (step S105). If this similarity degree is not smaller than a predetermined threshold value (step S106: NO), it is determined that identity is confirmed (step S107), followed by updating the reference pattern with the variation pattern. Conversely, if the similarity degree is smaller than a predetermined threshold value (step S106: NO), it is determined that identity is negated (step S109). Meanwhile, as described below, the smartphone saves the variation pattern that is most recently transmitted.

The similarity degree between two patterns can be calculated, for example, by calculating the convolution of the two patterns and obtaining the maximum value or the average value thereof as the similarity degree. The accuracy can be improved by making use of a calculation method on the basis of minutia points as used in biometric authentication, or any other calculation method. Also, the accuracy can be further improved by combining these calculation methods to calculate the similarity degree. A typical reference biometric information variation pattern can be obtained as a pattern having the greatest average similarity degree with collected variation patterns.

Figure 40:
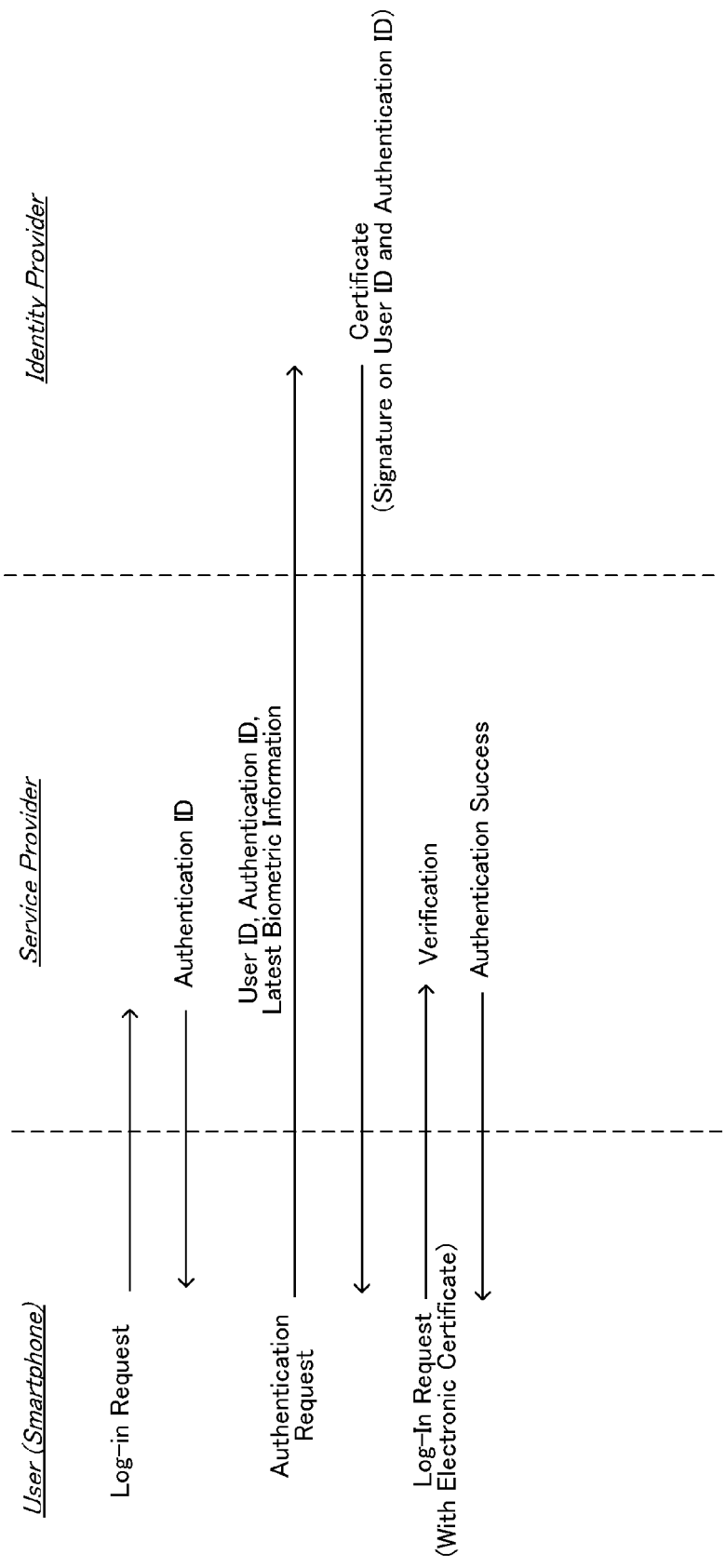
FIG. 40 is a view for explaining an specific example that a user logs in a service provider through a browser in accordance with the identity confirmation method of an embodiment 12 of the present invention.

In what follows, with reference to FIG. 40, a specific example will be explained in a situation that a user logs in a service provider through a browser of a smartphone.

Incidentally, in the case where the service provider makes use of the identity confirmation by the identity confirmation server 10, the service provider has to possess the URL and the public key of the identity confirmation server 10 in advance. The browser, the service provider and the identity confirmation server 10 communicate with each other by SSL.

At first, the user accesses a logon dialog of the service provider as shown in FIG. 6 through the browser of the smartphone. This logon dialog includes a form in which the user can enter a user ID. When the user presses a send button after entering the user ID, an authentication request is redirected to the identity confirmation server 10. This authentication request is transmitted to the identity confirmation server 10 together with the user ID, the URL of this service provider, an authentication ID and the latest biometric information. This latest biometric information can be the latest 128 bytes of the variation patterns which are most recently transmitted to the identity confirmation server 10 from the smartphone. These 128 bytes functions as a password.

The identity confirmation server 10 determines whether or not the latest biometric information is correct, and determines that the authentication succeeds if the latest biometric information is correct. When the user is authenticated, the identity confirmation server 10 generates an electronic certificate (RSA, ECDSA etc.), which certifies this fact, and redirects the certificate to the URL of the service provider. This electronic certificate certifies the authentication by associating the user ID with the authentication ID. The service provider verifies this electronic certificate with the public key of the identity confirmation server 10, and permits the user of the user ID to log on.

[Embodiment 12]

In this embodiment, the activity data acquired in an automobile is accumulated and managed in addition to the above life log data. If there is available, as equipment installed in an automobile, means for transmitting internal data such as running and manipulating information, a smartphone receives the transmitted data and transfers this data to the identity confirmation server 10 which then accumulates and manages the data.

The current automobile is equipped with a number of ECUs (Electronics Control Units) for controlling engine, meter, transmission gears, brake, power steering and so forth. CAN (Controller Area Network) is widely used as a network which connect these ECUs. CAN data is transmitted to a cloud through a smartphone on a real time base.

The information acquired through the CAN includes travel speed of automobile, rotational speed of engine, fuel injection amount, stroke amount of brake pedal, steering angle and so forth. In addition to this, the CAN can be used to acquire ambient weather condition, congestion, road icy condition and the like which can be detected by sensors installed in an automobile. The above CAN data is transmitted to a smartphone by a Wi-Fi function implemented in an OBD (On Board Diagnostics) connector.

There is information which cannot be acquired as internal data of a usual automobile or a smartphone. One important example of such information is the motion of the sight line of a driver. Several prior art techniques are expected to bring about safe driving by determining whether a driver is looking aside. In the case of such prior art techniques, the motion of the sight line is not accumulated as life log data, and there is no reason for accumulating life log data. In the case of the present embodiment, the motion history of the sight line is accumulated and managed as this data.

First, a sight line detector is installed in the front side of the driving seat of an automobile and in a position where the sight line detector does not obstruct the view of a driver, for example, a position on a dashboard or a position on a roof just adjacent to the windscreen. This sight line detector is provided with a near-infrared LED and a near-infrared camera. The sight line of a driver is detected by irradiating the face of the driver with the near-infrared LED and receiving the reflected light with the near-infrared camera. The direction of the face is also detected at the same time. Incidentally, while driving, the detection is continuously performed. The detected data is wirelessly transmitted to a smartphone from the sight line detector, and transmitted to a server from the smartphone. The sight line data of a driver is obtained, for example, as angles in the vertical and lateral directions. However, if the data is accumulated as it is, the amount of data is substantially large, and such data is inconvenient to use. Accordingly, the server performs sub-band encoding of the data.

Specifically, the raw data is accumulated in a buffer and divided into time domains in accordance with the types of the sight line motion, i.e., a domain in which the sight line hardly moves, a domain in which the sight line moderately moves, a domain in which the sight line actively moves, and so forth. Then, discrete wavelet conversion is performed for each domain, and the conversion result is accumulated and manazed in a life log database. Of course, if a sufficient capacity is available, a reversible compression is performed for each domain to save all the raw data.

Such a sight line motion history can be used to analyze the usual ways and problems of a driver. However, in this case, the sight line motion history is used to perform authentication as one application thereof. First, a predetermined amount of wavelet coefficients are accumulated, and several types of patterns are extracted therefrom. For example, the types of patterns include motions of sight line just after applying a brake, just after starting running, and when starting after stopping at a red light, and the distribution of frequency components. The identity confirmation server 10 then generates reference patterns which represent the characteristics of the sight line motion of a user, and transmits the reference patterns to a smartphone.

Figure 41:
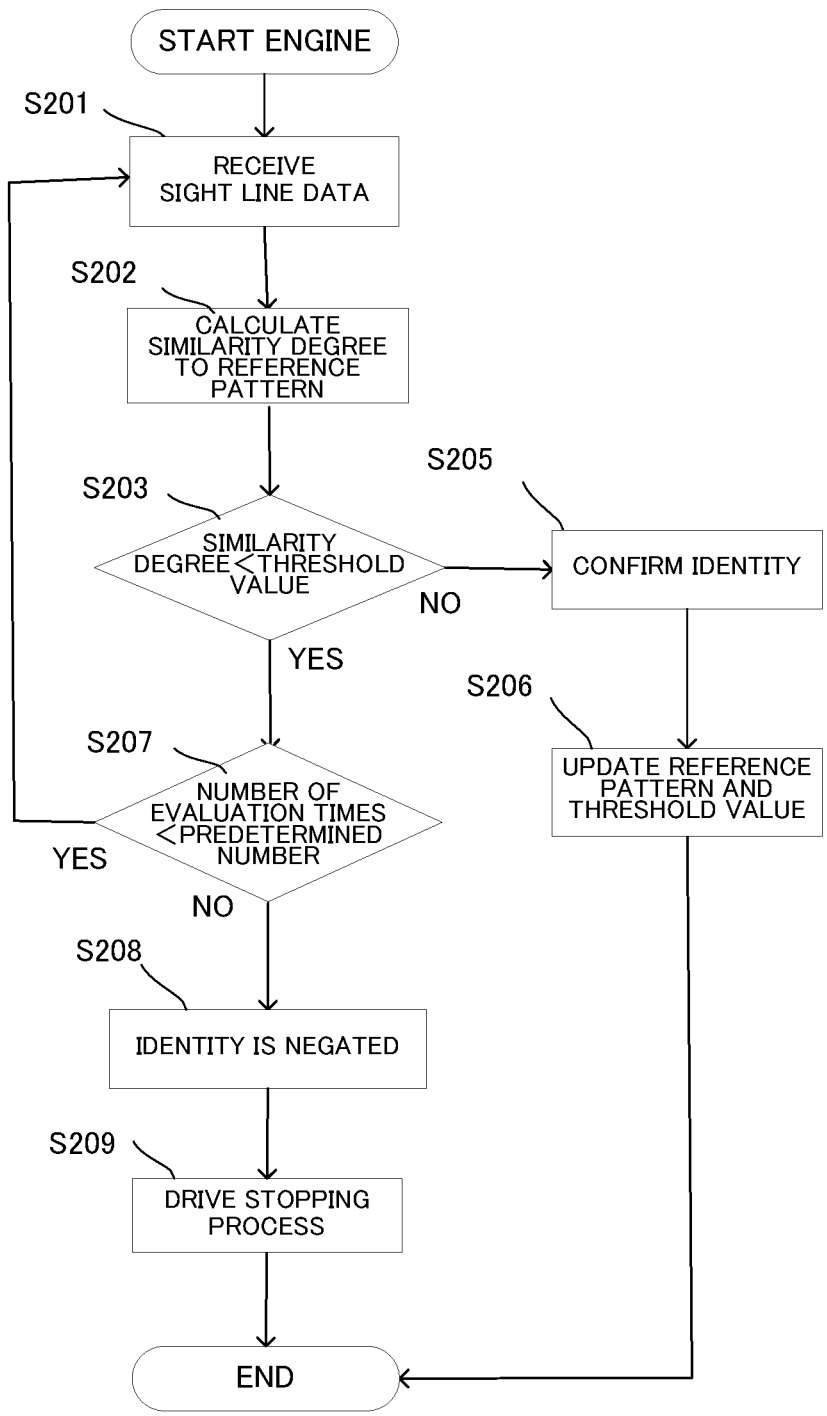
FIG. 41 is a block diagram for explaining a method of performing identity confirmation when an automobile starts in accordance with the identity confirmation method of an embodiment 13 of the present invention.

In what follows, identity confirmation of a driver after generating the reference patterns will be explained with reference to FIG. 41. This process is performed just after starting driving. After performing identity confirmation, driving can be continued as it is, while the sight line motion is continuously acquired also thereafter.

When the user himself drives an automobile, an engine is started to drive. Thereafter, sight line data is continuously received by a smartphone (step S201). However, since identity confirmation is not performed yet, this data is not transmitted to the server. When the sight line motion history is accumulated in the smartphone for a predetermined period, preferably five or more minutes, for example ten minutes, the history data is processed by discrete wavelet conversion, and the similarity degree between the reference pattern and the history data as converted is calculated (step S202). For example, the convolution is performed to obtain the maximum value or the average value thereof as the similarity degree. The accuracy can be improved by making use of a calculation method on the basis of minutia points as used in biometric authentication, or any other calculation method. Also, the accuracy can be further improved by combining these calculation methods to calculate the similarity degree.

If this similarity degree is not lower than a threshold value (step S203: NO), it is determined that the identity confirmation succeeds (step S205), and the sight line motion history data is transmitted to the server. The server updates the reference pattern by the use of the sight line motion history data. In addition to this, the server calculates the similarity degree between the updated reference pattern and past history data and determines a more reliable threshold value. The updated reference patterns and the updated threshold values are transmitted to the smartphone which then update the reference patterns and the threshold values stored therein. Incidentally, a sufficiently reliable threshold value is a threshold value with which a proper user is not confirmed as another person. Practically, the threshold value can be a value which is smaller than the minimum value of the similarity degree obtained with past history data.

On the other hand, when another person drives, an engine is started to drive. Thereafter, sight line data is continuously received by a smartphone (step S201), and after accumulated for the predetermined period, the sight line data is processed by discrete wavelet conversion to calculate the similarity degree to the reference pattern (step S202). If this similarity degree is smaller than the threshold value (step S203: YES), there is the possibility that the person who is driving is not the proper user. However, since the acquired data may be dispersed if only the pattern of starting driving is evaluated, the similarity degree is calculated with respect to other sight line motion patterns, for example, just after applying a brake, just after stepping on an accelerator, just after starting after stopping at a red light and so forth.

Namely, a motion pattern is continuously acquired in another domain in step S201, a similarity degree is calculated in step S202, and the similarity degree is evaluated in step S203. If this similarity degree is not lower than a threshold value (step S203: NO), it is determined that the identity confirmation succeeds (step S205), and the identity confirmation process is finished.

In the case where this similarity degree does not become the threshold value or higher even if the evaluation is repeated a predetermined number of times (step S203: YES), it is determined that the person is other than the proper user (step S208), followed by starting the process of stopping driving (step S209). For example, an announcement states such that "An unanticipated situation occured. Please move to a safe place and stop within ten minutes". If the automobile does not stop within ten minutes, the automobile is controlled to be gradually powered down. After stopping, the engine cannot be started even if an start operation is performed.

[Embodiment 13]

In this embodiment, the data acquired by a wearable terminal is accumulated and managed in addition to the above life log data. The data of this wearable terminal is wirelessly transmitted to the smartphone which then transfer the data to the identity confirmation server which accumulates and manages the data. In this case, an example will be explained with a wristband type or wrist watch type wearable terminal.

This wearable terminal incorporates an acceleration sensor and a gyro sensor to directly measure the motion of an arm. Accordingly, patterns of individual habits and characteristic movements are recorded and used to estimate activity content in combination with other life log data. Also, identity confirmation can be performed by detecting the characteristic movement.

For example, when golf swing is practiced in a golf driving range, the pattern data of swinging a club is transmitted to a server of the golf driving range from the wearable terminal through a smartphone as a "motion pattern" which is biometric information. The server of the golf driving range can perform identity confirmation by biometric authentication on the basis of this data. It is thereby possible to give special rates to regular customers.

INDUSTRIAL APPLICABILITY

As has been discussed above, in accordance with the visited location history matching system of the present invention, an identity confirmation system is provided which does not require users to remember passwords, and automatically updates credentials. Accordingly, users can be released from a burden of selecting and memorizing passwords, and identity confirmation can more safely be performed.

The foregoing description of the embodiments has been presented for purposes of illustration and description. It is not intended to be exhaustive or to limit the invention to the precise form described, and obviously many modifications and variations are possible in light of the above teaching. The embodiment was chosen in order to explain most clearly the principles of the invention and its practical application thereby to enable others in the art to utilize most effectively the invention in various embodiments and with various modifications as are suited to the particular use contemplated.

The life log data of the present embodiment and the above embodiments is particularly private. Accordingly, it is preferred to make it possible to select data items to be recorded in accordance with user's settings. For example, a dialog box shown in FIG. 37 is presented in order that a user can arbitrarily select life log data items to be accumulated and managed by the identity confirmation server 10.

EXPLANATION OF SYMBOLS

A, B user
1 server
2 history table
3A, 3B mobile communication device
5, 15 satellite
7 base station
10 life log server
13 smartphone
20 electric appliance

The invention claimed is:
1. A life log management method comprising:
managing a life log by a life log server which receives records of life log data transmitted from a mobile communication device of a user through the Internet, comprising:
encrypting the records with an encryption key at the mobile communication device;
transmitting the encrypted records from the mobile communication device to the life log server;
receiving the encrypted records at the life log server;
saving the encrypted records in encrypted states at the life log server; and
transmitting the encrypted records from the life log server to the mobile communication device, wherein the encryption key is not given to the life log server so that the encrypted records cannot be decrypted at the life log server side.

2. The life log management method of claim 1, wherein the life log server stores and manages each encrypted record in association with the date and time when the each encrypted record is received.

3. The life log management method of claim 1, wherein the life log server functions also as an identity confirmation server which performs identity confirmation of the user by the use of the encrypted records, wherein the mobile communication device also transmits false records whose contents are based on false log data and encrypted when the mobile communication device transmits the records of the life log data as true records to the identity confirmation server in order that it can be determined by the identity confirmation server which records are true and which records are false, wherein the identity confirmation server stores and manages the true records and the false records distinctively, wherein the identity confirmation server extracts a plurality of records from the true and false records which are store and managed in the identity confirmation server, and transmits the extracted records to the mobile communication device, wherein the mobile communication device decodes the received records, shows the decoded records to the user, and receives input data indicative of which records are true from the user who can select true records as input data from among the received records with reference to the content of the received records as decoded, wherein the mobile communication device transmits the input data provided by the user to the identity confirmation server through the Internet, and wherein the identity confirmation server evaluates the input data provided by the user, and determines whether to make the identity confirmation succeed on the basis of the result of the evaluation.

4. The life log management method of claim 3, wherein the mobile communication device transmit the true records and the false records to the identity confirmation server in a predetermined order, and the identity confirmation server determines true or false of the records on the basis of the order in which the records are received.

5. The life log management method of claim 1, wherein the life log data is data acquired from a smart appliance.

6. The life log management method of claim 5, wherein the mobile communication device is provided with functionality of controlling the operation of the smart appliance, and the life log data which is acquired from a smart appliance is transmitted to the server through the mobile communication device.

7. The life log management method of claim 1, the life log data is data acquired from a sensor which is incorporated in the mobile communication device.

8. The life log management method of claim 7, wherein the sensor is any one of an acceleration sensor, a gyro sensor, an azimuth sensor, an atmospheric pressure sensor, a temperature sensor, a proximity sensor and an illuminance sensor.

9. The life log management method of claim 1, wherein the mobile communication device is provided with functionality of transmitting and receiving email, and wherein the life log data is data about the transmission and reception of email performed by the mobile communication device.

10. The life log management method of claim 1, wherein the mobile communication device is provided with functionality of telephone conversation, and wherein the life log data is data about telephone conversation performed by the mobile communication device.

\* \* \* \* \*